(12) United States Patent
Roy et al.

(10) Patent No.: US 12,375,743 B1
(45) Date of Patent: *Jul. 29, 2025

(54) MULTI-PARTICIPANT MEDIA CONTROL AND PLAYBACK

(71) Applicant: Block, Inc., San Francisco, CA (US)

(72) Inventors: Arindaam Roy, San Francisco, CA (US); Demetrius King, San Francisco, CA (US); Olayiwola Bakare, San Francisco, CA (US); William Wang, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,687

(22) Filed: Jan. 2, 2024

Related U.S. Application Data

(63) Continuation of application No. 18/070,076, filed on Nov. 28, 2022, now Pat. No. 11,902,607.

(51) Int. Cl.
| | |
|---|---|
| H04N 21/254 | (2011.01) |
| H04L 65/1069 | (2022.01) |
| H04N 21/239 | (2011.01) |
| H04N 21/258 | (2011.01) |
| H04N 21/262 | (2011.01) |

(52) U.S. Cl.
CPC ..... *H04N 21/2541* (2013.01); *H04L 65/1069* (2013.01); *H04N 21/2393* (2013.01); *H04N 21/25816* (2013.01); *H04N 21/26258* (2013.01)

(58) Field of Classification Search
None
See application file for complete search history.

(56) References Cited

U.S. PATENT DOCUMENTS

| | | | |
|---|---|---|---|
| 11,522,703 | B1 | 12/2022 | Jain et al. |
| 2011/0314388 | A1 | 12/2011 | Wheatley |
| 2019/0294817 | A1 | 9/2019 | Hennebert et al. |
| 2022/0353223 | A1* | 11/2022 | Ceccato ............... G06F 16/639 |

\* cited by examiner

*Primary Examiner* — James R Marandi
(74) *Attorney, Agent, or Firm* — IP Spring

(57) ABSTRACT

The disclosed technology provides greater security and control to the field of collaborative playlists by utilizing access policies and access tokens to control which user accounts can access a collaborative playlist, what permissions are provided to user accounts that can access a collaborative playlist, and to schedule future permission changes.

20 Claims, 13 Drawing Sheets

MULTI-PARTICIPANT MEDIA CONTROL AND PLAYBACK

RELATED APPLICATIONS

This application is a continuation of U.S. patent application Ser. No. 18/070,076, filed on Nov. 28, 2022, which is hereby incorporated by reference in its entirety.

TECHNICAL FIELD

Many conventional service providers allow uploading or streaming of media content. However, conventional service providers do not provide adequate organization or sharing of related media content amongst users.

BRIEF DESCRIPTION OF THE DRAWINGS

Details of one or more aspects of the subject matter described in this disclosure are set forth in the accompanying drawings and the description below. However, the accompanying drawings illustrate some typical aspects of this disclosure and are therefore not to be considered limiting of its scope. Other features, aspects, and advantages will become apparent from the description, the drawings and the claims.

DETAILED DESCRIPTION

Figure 1:
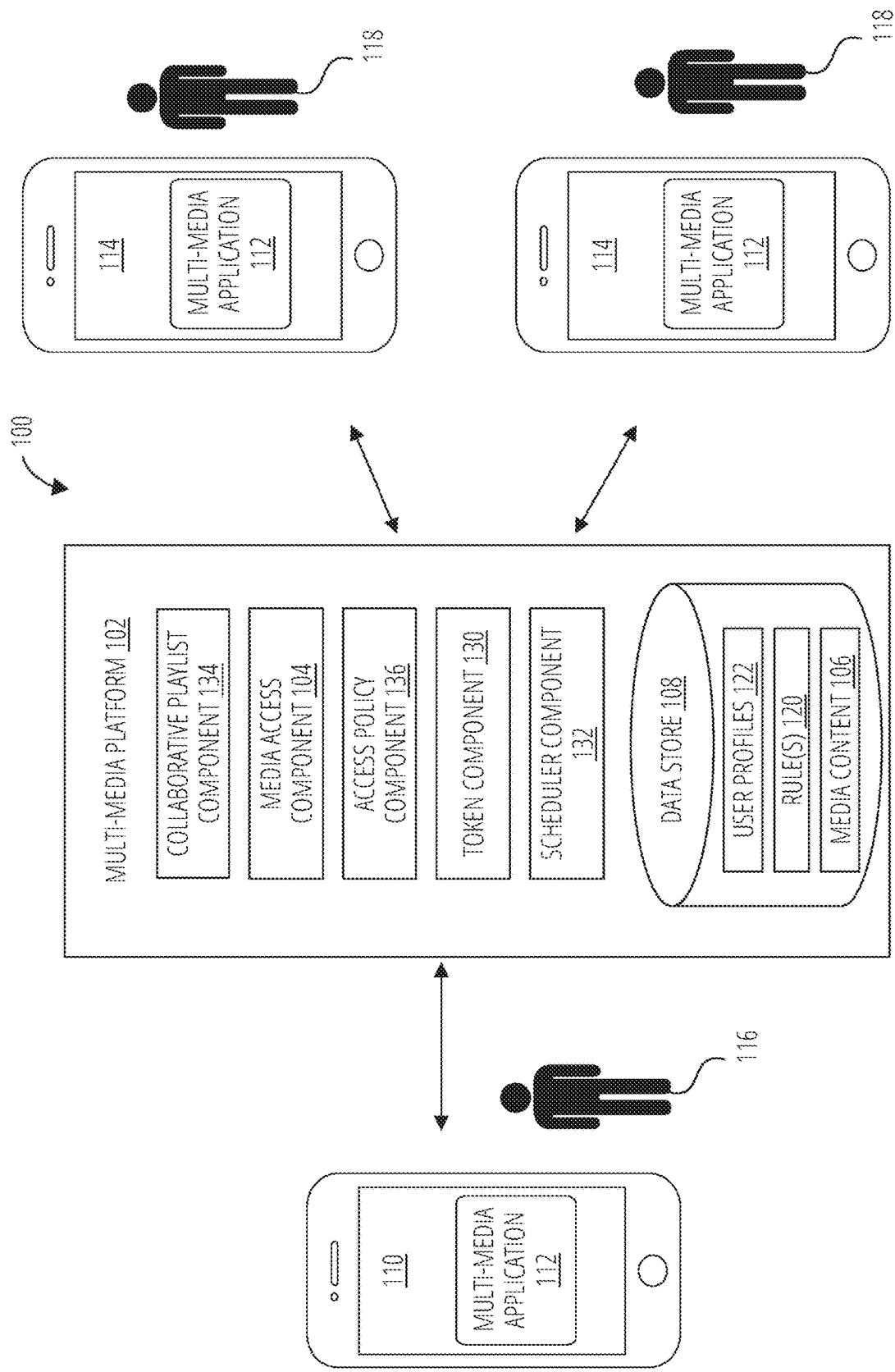
FIG. 1 illustrates an example environment for hosting and interacting with a collaborative playlist that utilizes access policies and access tokens to manage access to the collaborative playlist in accordance with some aspects of the present technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Various examples of the disclosure are discussed in detail below. While specific implementations are discussed, it should be understood that this is done for illustration purposes. A person skilled in the relevant art will recognize that other components and configurations may be used without parting from the spirit and scope of the disclosure.

Disclosed are methods and systems for creating and provisionally sharing collaborative playlists of one or more media content items, e.g., songs and videos. A collaborative playlist is a playlist that is configured to permit multiple user accounts to interact with a collaborative queue of the collaborative playlist to add content items and/or rearrange the order of the content items in the collaborative queue, and to permit user accounts to playback the content items in the collaborative playlist. The collaborative queue is an interface in which user accounts can collaborate to create the collaborative playlist by adding content items and arranging and rearranging an order of the content items in the collaborative queue. A user (e.g., a playlist owner) can create a collaborative playlist. Furthermore, the user (e.g., the playlist owner) can select (e.g., invite) one or more group contributors (e.g., one or more invitees) to collaborate in creating and/or maintaining the collaborative playlist. The user (e.g., the playlist owner) can set access policies and tokens for the collaborative playlist as well as permissions for the one or more group contributors (e.g., the one or more invitees). Each of the group contributors (e.g., the one or more invitees) can receive a notification (e.g., an invitation) to contribute to the collaborative playlist (e.g., for a defined period of time).

Typically, playlists can be shared with specific user accounts, and some playlists can be made public and findable by anyone with a user account to a media service. Those playlists can then be played-back in an individual playback experience. However, conventional methods allow any user with a valid link to access the playlist even if the user received the link in error. Further, once a user account has access to a collaborative playlist, the way to manage access (remove access by the user account or change an access level) is to manually edit a list of user accounts. Requiring an owner of a playlist to manage the collaborative playlist through manual edits of a list of user accounts is cumbersome, and causes the owner of the playlist to regularly review the list of user accounts with access to the collaborative playlist.

To this end, the disclosed technology provides greater security and control to the field of collaborative playlists by utilizing at least one of access policies and access tokens to control which user accounts can access a collaborative playlist, what permissions are provided to user accounts that can access a collaborative playlist, and to schedule future permission changes.

Further, the present technology can prevent unauthorized user accounts from accessing a collaborative playlist. Some existing collaborative playlist products utilize temporary links to control which user accounts can access the collaborative playlist. A temporary link provides access to a collaborative playlist for a set amount of time, but anyone that has an instance of the temporary link can access the collaborative playlist as long as the playlist is accessed during the set amount of time. Therefore, a link can be delivered to an undesired recipient and/or fall victim to attacks, such as brute force attacks, by malicious parties desiring access to the playlist. While an expiring link can provide some limits to unfettered access to a collaborative playlist, the expiring link approach does not prevent user accounts that properly receive the link from forwarding the link to other user accounts. Since any user account that attempts to access the link before the link expires can gain access to the collaborative playlist, this mechanism does not prevent unintended user accounts from accessing the collaborative playlist. The techniques described herein mitigate these issues by associating an access token with an access policy. A user wishing to gain access to the collaborative playlist can have an access token to gain access. And even if the user account has an access token, the policy tied to the access token can revoke the access token or limit access to the collaborative playlist. In this way, the user account sharing the collaborative playlist can have greater control over user accounts that can access the collaborative playlist.

In some implementations, the present technology can make it easier to manage access control lists associated with a collaborative playlist. Generally, a user account that has initiated (e.g., the first user account to share a playlist for collaboration) a collaborative playlist has administrative privileges associated with the collaborative playlist. Administrative privileges provide a user account with rights to change an access policy, configure rules for the behavior of the collaborative playlist, can moderate actions by other user accounts interacting with the collaborative playlist (prevent user accounts from skipping or adding new content items, etc.). In some cases, other user accounts can also have administrative privileges and/or be considered an owner of the collaborative playlist. An owner of a collaborative playlist has administrative privileges and can delegate or otherwise assign administrative privileges to other user accounts. Users that have administrative privileges typically make changes to an access control list by individually changing access rights/roles to the collaborative playlist manually. However, the present technology can utilize access policies to automatically adjust access rights/roles to a collaborative playlist by controlling a scheduler to modify or revoke an access token, and correspondingly access to the collaborative playlist, media content item, or even ownership of the media content item.

The access policies can define types of access to the collaborative playlist. Some types of access include permitting a user account to view the content items in a collaborative playlist, add content items to a collaborative playlist, vote on content items in a collaborative playlist, control playback of content items in a collaborative playlist, and/or playing content items from an output device associated with a user device.

These access policies enable a greater number of use cases for collaborative playlists.

According to one implementation, one use case includes creating a collaborative playlist associated with an event, where the collaborative playlist permits user accounts to add content items to a collaborative queue that is part of the collaborative playlist during a limited period, and thereafter user accounts may no longer edit the content items in the collaborative queue. Thereafter the collaborative playlist can be played. One real world use case can include allowing invitees to a party to add content items to a collaborative playlist that will be played at the party. User accounts can add content items provisionally or temporarily, e.g., until the party is scheduled to begin, and thereafter most user accounts will not be able to make changes or control the collaborative playlist. Selected user accounts may continue to control the collaborative playlist to initiate playback of content items in the collaborative playlist and/or to adjust the order of content items in the collaborative queue, to name a few examples. To enable this, in one implementation, the disclosed methods and systems apply time-based tokens and/or policies. For example, a token with a predefined timer can control when and how the content item can be accessed or modified.

Another use case includes creating a collaborative playlist where user accounts that are members of the collaborative playlist are located in physical proximity (e.g., within 100 meters such as when at a house party, within 10 meters such as when in a small group, etc.), to each other, and while each user account can interact with the collaborative playlist using their user device, a subset of the client devices (e.g., one client device) have permissions to playback the content items. For instance, an access policy can define physical proximity of the user devices associated with the user accounts that are members of the collaborative playlist to interact with the collaborative playlist. Furthermore, the access policy can define which user accounts have permissions to access, edit, control, and/or play back the collaborative playlist by adjusting when a user device is no longer proximate to the other user devices associated with the user accounts that are also members of the collaborative playlist. For example, when a second user device associated with a second user account is proximate to a first user device that is designated to playback the content items of the collaborative playlist, the second user account can add content items or change the order of content items in the collaborative playlist. However, once the second user device is no longer proximate to the first user device, the access of the second user account can be changed to read only, where the second user account can see the contents of the collaborative playlist, but the second user account cannot edit the content items in the collaborative playlist or control playback. In one implementation, where there are a number of devices, there may be arbitration, e.g., using interactive elements for voting, to allow which account or device plays, or which account is assigned to be a designated administrator. Such arbitration can be supported by analytics to help in voting, e.g., listener analytics, number of admin status on playlists, etc.

In addition to the enhanced use cases enabled by the present technology, the present technology can also offer greater security features with respect to collaborative playlists. The access policies associated with the collaborative playlist can control which user accounts can access the collaborative playlist and what privileges can be associated with the user accounts before a user account attempts to join a collaborative playlist. In this way, user accounts can be prevented from accessing a collaborative playlist to which the second user accounts are not invited, even if the second user accounts are in possession of a valid link to join the collaborative playlist. For example, the techniques described herein associate an access token with an access policy. A user wishing to gain access to the collaborative playlist can have an access token to gain access. Even if the user account has an access token, the policy tied to the access token can revoke the access token or limit access to the collaborative playlist. In this way, the user account in sharing the collaborative playlist can have greater control over user accounts that can access the collaborative playlist.

In some implementations, the present technology can allow the playlists to be built using media content items from one or more third party platforms. For example, a first device streaming the collaborative playlists may have executing thereon a first media platform, however, another device contributing to the collaborative playlist may have executing thereon another media platform different from the first media platform. Through provisional sharing of user credentials for the purpose of collaborative playlist, the first device can stream media content even though the second media platform is not executing on the first device. In one implementation, the second user's credentials are ported, temporarily, over to the first device to enable content sharing across media platforms. In some examples, a fuzzy finder detects "similar" media content items, e.g., songs similar in tempo, musicality, similar singer, etc., if the same media content item is unavailable on the first media platform or otherwise inaccessible on the first media platform, even with second user's credentials.

These and other benefits of the presented technology will be addressed further herein with respect to one or more examples.

FIG. 1 illustrates an example environment 100 for hosting and interacting with a collaborative playlist that utilizes access policies and access tokens to manage access to the collaborative playlist. In some examples, the environment 100 can include a multi-media platform 102. The multi-media platform 102 can provide one or more services. Examples of such services include a media access component 104 (to allow access to media, such as songs, video, audio, or a combination thereof), and a collaborative playlist component 134 (to provide functionality related to collaborative playlists).

In some examples, the multi-media platform 102 can provide one or more services surrounding the streaming, playback, management, sharing, editing (e.g., mixing and/or remixing media, adding annotations to media), or social engagement around media content, etc. In particular, the multi-media platform 102 can provide one or more services for supporting collaborative playlists, including a collaborative playlist component 134. A collaborative playlist is a playlist that is configured to permit multiple user accounts to interact with a collaborative queue of the collaborative playlist to add content items and/or rearrange the order of the content items in the collaborative queue, and to permit user accounts to playback the content items in the collaborative playlist.

In some examples, the multi-media platform 102 can include a media access component 104 that is configured to provide functionality around the accessing, e.g., browsing, broadcasting, streaming, and playback, of media content such as those media content 106 stored at data store 108. While the term streaming is used herein, the provision of media content by the multi-media platform 102 may not conform to any particular data transfer technique or protocol unless otherwise stated. The media access component 104 can provide content items for inclusion in the collaborative playlist and playback from the collaborative playlist The environment 100 may be for hosting and interacting with a collaborative playlist that utilizes access policies and access tokens to manage access to the collaborative playlist. In some examples, a user account can create and share a collaborative playlist. In a collaborative playlist a first user account can engage with one or more other user accounts to jointly control playback or edit a playlist.

In some examples, the multi-media platform 102 includes an access policy component 136, token component 130, and scheduler component 132 that collectively support access and administration of access to collaborative playlists. A first user 116 associated with a first user account can create an access policy supported by the access policy component 136 to be associated with a collaborative playlist. The access policy can determine which second user accounts or other first user accounts can access the collaborative playlist and can also include conditions upon which a user account's access will change.

The access policy component 136 can determine which user accounts can be granted access to a collaborative playlist, and the access policy component 136 can authorize the token component 130 to issue an access token to the accessing user account. User accounts that have a valid access token may initiate a session to access the collaborative playlist. For example, a first user 116 having a first user account at the multi-media platform 102 can create a collaborative playlist by configuring an access policy to be associated with a playlist that permits one or more second users 118 having respective second user accounts at the multi-media platform 102 to access the collaborative playlist. The access policy can be used to both control which second user accounts can access the collaborative playlist and can automatically control future changes to access the collaborative playlist by the user accounts that can access the collaborative playlist. In some examples, the access policy permits second users that do not have a second user account with the multi-media platform 102 when the access policy is created to access the collaborative playlist. For instance, the access policy may designate that the multi-media platform 102 create a temporary second user account to provide the second users with access to the collaborative playlist.

The access policies can define types of access to the collaborative playlist. Some types of access include permitting a user account to view the contents content items in a collaborative playlist, adding content items to a collaborative queue, voting on content items in a collaborative queue, controlling playback of content items in a collaborative playlist, and/or playing content items from an output device associated with a user device.

The token component 130 is configured to issue an access token that is a data object used to gain access to the collaborative playlist. The access token is subject to conditions upon which it can expire or be revoked. The access tokens may be periodically refreshed. These access policies and access tokens enable a greater number of use cases for collaborative playlists and provide more efficient management of the collaborative playlist and increased control over second user accounts that can access the collaborative playlist. The access policies enable use cases for the collaborative playlist in which access rights to the collaborative playlist are adjusted based on time, location of a user attempting to access the collaborative playlist, or other parameters defined in the access policies. For example, a collaborative playlist can be used to collect content items prior to an event for a disc jockey ("DJ") to play at the event, where users can add content items to the collaborative playlist for a limited period of time. In another example, a collaborative playlist can be used to allow first user accounts to control playback of a collaborative playlist on a device associated with another user account when the first user accounts are proximate to the device associated with the another user account.

The scheduler component 132 can interface with the access policy component 136 to facilitate changes in access based on schedule. For example, some access policies can be associated with periods after which access to the collaborative playlist can be changed. The scheduler component 132 can automatically update the access tokens through interfacing with the token component 130 at the scheduled time. The scheduler component 132 can be configured based on a policy managed by the access policy component 136 to take actions to modify the access token at the scheduled time.

The collaborative playlist component 134 can provide access to a collaborative playlist when a user account is associated with a valid access token. The collaborative playlist can provide shared access, editing, and control privileges with one or more second users (the second users may or may not be associated with a second user account). In some examples, the collaborative playlist component 134 can provide access to a collaborative queue to provide the functions adding content items, arranging content items in the queue, voting for content items to be added to or removed from the queue, and voting (upvoting) for content items to be promoted to an earlier position in the queue. For example, in one use case of a collaborative playlist, multiple user accounts can add content items to the collaborative playlist, and the user accounts can arrange the playback order of the content items. The collaborative playlist component 134 can also provide the collaborative playlist which includes the content items from the collaborative queue in the order in which content items are arranged in the collaborative queue for playback of the content items.

In some examples, the users associated with the user accounts may experience the playback on their own user device. In some examples, the playback on their own devices may be synchronous (at the same time as other users) or asynchronous (where individual users play back the content independently of one another). In some examples, the users associated with the user accounts may experience the playback on a single audio output device, such as a loudspeaker communicatively coupled to a user device associated with a user account having access to the collaborative playlist.

In some examples, a first user 116 can operate a computing device, such as a first user device 110, to utilize services offered by the multi-media platform 102. Generally, the first user 116 will have a first user account at multi-media platform 102, and will log into the first user account at the multi-media platform 102 through an instance of multi-media application 112 operating on first user device 110. The first user device 110 can be configured to communicate with the multi-media platform 102 over one or more networks. In some examples, the first user device 110 can have one or more multi-media applications 112 stored thereon that can specially configure the first user device 110 to communicate with the multi-media platform 102. In some examples, one or more applications can be provided by the multi-media platform 102 (e.g., to access one or more services associated therewith). In some examples, each application can be associated with a service provided by the multi-media platform 102. In some examples, the first user 116 can access service(s) of the multi-media platform 102 via a web browser or other access point. As used herein, a "platform" can comprise computing components (e.g., software and a surrounding ecosystem of resources) associated with service(s) provided by the service provider providing the multi-media platform 102. While a single first user 116 is illustrated, any number of first users can be present in the environment.

First user 116 can be any entity that has administrative rights to a collaborative playlist. Administrative rights provide a user account with rights to change an access policy, configure rules for the behavior of the collaborative playlist, can moderate actions by other user accounts interacting with the collaborative playlist (e.g., prevent user accounts from skipping or adding new content items, etc.). In some examples, the first user can be an artist, label, publisher, or user subscribed to a media service provided by multi-media platform 102.

In some examples, one or more second users 118, can operate respective computing devices, such as a second user device 114. For example, the second user 118 will have a second user account at multi-media platform 102, and will log into the second user account at the multi-media platform 102 through an instance of multi-media application 112 operating on the second user device 114 or through a webpage/web application rendered by a web browser application operating on the second user device 114. In some examples, a second user may not be subscribed to the media service but is able to see the activity of the users either on the media service or on a third-party platform. Users that wish to access a collaborative playlist that have not established a user account at multi-media platform 102 can create a temporary user account.

First user 116 and second user 118 refer to users having access to a collaborative playlist through a user device. While the first user 116 and second user 118 are distinguished in FIG. 1 and throughout this description, the distinction between a first user 116 and second user 118 refers to a role or permission with respect to a particular collaborative playlist. A user that is designated a second user 118 when referring to one collaborative playlist can be a first user 116 referring to another collaborative playlist and vice versa. The user roles (e.g., first user 116 or second user 118) are not mutually exclusive. Likewise, while different devices (e.g., first user device 110 and second user device 114) are separately illustrated, the devices are not necessarily distinct. The devices can all run different instances of the same multi-media application and all include the same functionality when their respective user controls the devices to engage in such functionality. Accordingly, a device that is a first user device 110 in one context can be a second user device 114 in another context.

The first user device 110 and second user devices 114 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The multi-media platform 102 can be hosted by one or more servers or other types of computing devices that can be embodied in any number of ways. For example, in the example of a server, components, other functional components, and/or data can be implemented on a single server, a cluster of servers, a server farm or data center, a cloud-hosted computing service, a cloud-hosted storage service, and so forth, although other computer architectures can additionally or alternatively be used.

In some examples, the second user device 114 can communicate with the first user device 110 via the network (and vice versa). In some examples, the second user device 114 can communicate with the first user device 110 directly (e.g., without going through the multi-media platform 102) and/or indirectly (e.g., via the multi-media platform 102). In some examples, the first user device 110 or second user device 114 can be associated with functionality to enable the first user device 110 or second user device 114 to send and/or receive communications. Such communications can include text communications, email communications, social media communications, first-party application communications (e.g., communications exchanged via an application associated with the service provider providing the multi-media platform 102), third-party application communications (e.g., communications exchanged via an application associated with a party other than the service provider and accessible by the service provider through one or more dedicated application programming interface ("API") connection points), payments (e.g., from host computing device), requests to change playlists or performance, etc. While one second user device 114 is shown, any number of second user devices 114 can be present in the environment. Similarly, any number of first user devices 110 may be present in the environment. Each of the first user devices 110 and second user devices 114 can execute a respective instance of the multi-media application 112.

In some examples, the data store 108 can store user profiles 122. The user profiles can store information pertaining to user accounts of the multi-media platform 102. In some examples, some user accounts can pertain to artists whose media content are accessible through the multi-media platform 102. In some examples, artist user accounts can be associated with additional privileges as compared to general user accounts. In such instances, the artist user accounts can be verified that the artist account is associated with one or more media content accessible through the multi-media platform 102.

The user profiles 122 can also store permissions associated with the user account. The permissions can indicate which users are permitted to send and/or receive communications. In some examples, such permissions can be particular to an individual user, a user, a title or role associated with a user (e.g., digital rights associated with a title of artist, label, publisher, or the like). In some examples, permissions can be particular to device codes (e.g., codes provisioned to users to grant temporary access to a functionality). The permissions can provide security and/or access control to individual communications. That is, in some examples, the permissions can enable the multi-media platform 102 to selectively present communications to certain users while restricting access of other users to certain communications. In some examples, the multi-media platform 102 can utilize the permissions to restrict how users are able to interact and/or respond to communications, and/or access media. In some examples, permissions can be set via a settings user interface.

User profiles can store, or otherwise be associated with, data associated with users through their user accounts (first user accounts, second user accounts, artist accounts). For instance, a user profile can store, or otherwise be associated with, information about a user (e.g., name of the user, geographic location of the user, operating hours of the user, streaming statistics, user preferences (e.g., learned or user-specified), identifier(s) of the user (which can be associated with different communication channels and/or platforms), etc.), a user category classification (subscriber level, artist level, etc., hardware (e.g., device type) used by the user. The user profiles can also be generated for a group of users collaborating on a playlist or collection of media content items. Each such playlist can then be associated with a dedicated group profile. Accordingly, the present technology recommends media content items to a specific user or specific group.

Figure 2:
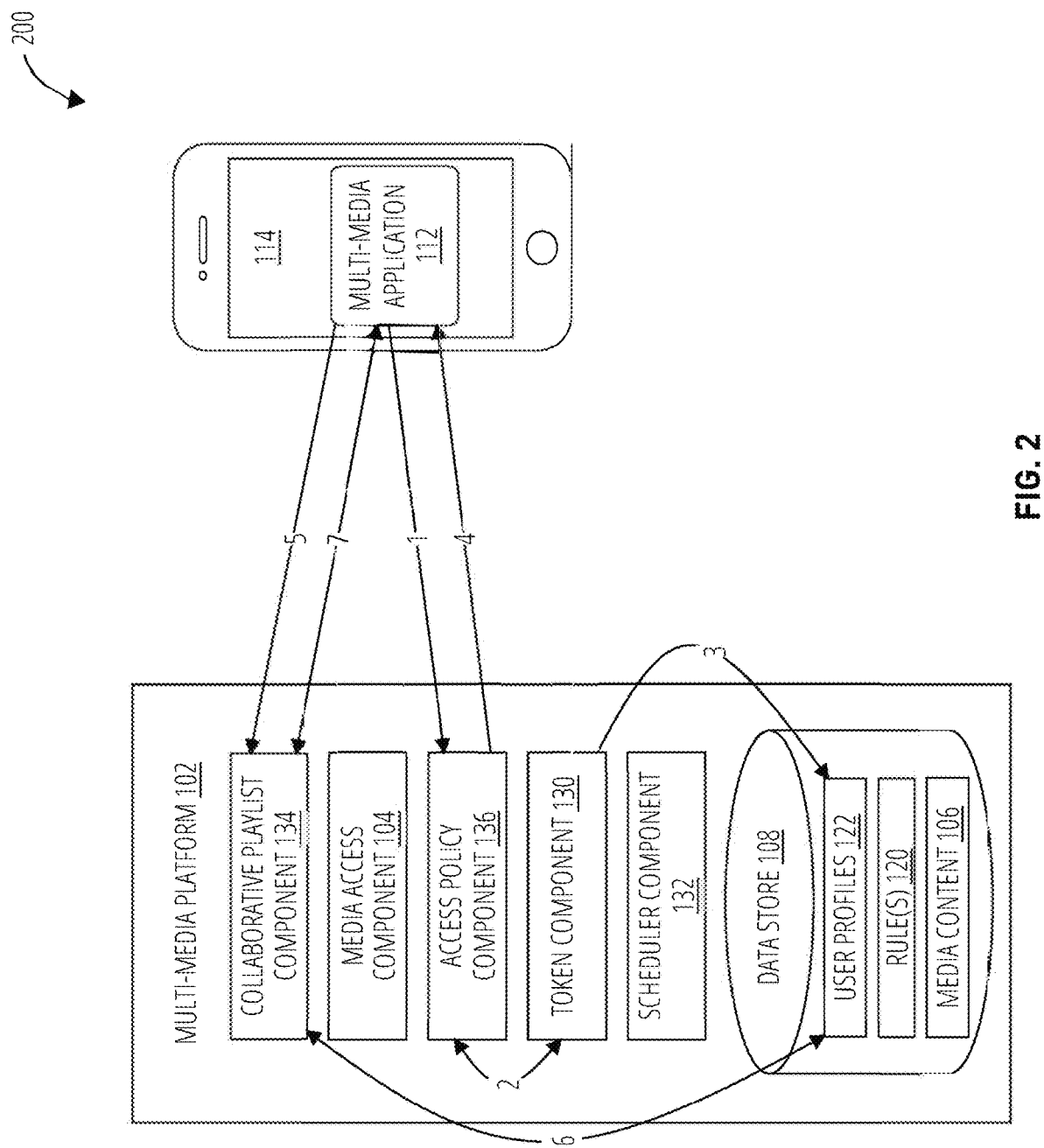
FIG. 2 illustrates an example environment showing communication flows between the multi-media application and components of the multi-media platform that provide services related to accessing a collaborative playlist in accordance with some aspects of the present technology.

FIG. 2 illustrates an example environment 200 showing communication flows between the multi-media application 112 and components of the multi-media platform 102 that provide services related to accessing a collaborative playlist. Although the example environment 200 depicts a particular sequence of operations, the sequence may be altered without departing from the scope of the present disclosure. For example, some of the operations depicted may be performed in parallel or in a different sequence that does not materially affect the function of the communication flows.

When a second user account desires to access a collaborative playlist for the first time, a second user 118 can operate the second user device 114 to access a link for the collaborative playlist. In response, the multi-media application 112 can make an initial request (communication 1) to access the collaborative playlist. The multi-media platform 102 can determine that the multi-media application 112 does not yet have a session established that provides access to the collaborative playlist and causes the access policy component 136 to evaluate whether the second user account is permitted to access the collaborative playlist.

The access policy component 136 can determine that the second user account is permitted to access the collaborative playlist when an access policy managed by the access policy component 136 permits access to the second user account.

The access policy component 136 communicates with the token component 130 (communication 2) to issue an access token to the collaborative playlist and can provide a token identifier to the access policy component 136. The token component 130 can also store (communication 3) the access token as part of the user profile 122 for the second user account. In some examples, the access token can be encrypted prior to storage.

The access policy component 136 can send a redirect communication (communication 4) to the multi-media application 112 with data to allow the multi-media application 112 to identify access rights by referencing the access token stored in association with the user profile of the second user account. The redirect communication can cause the multi-media application 112 to again request access to the collaborative playlist (communication 5) by referencing the access token identifier.

The collaborative playlist component 134 can confirm that the access token referenced in the request for access token is valid by looking up (communication 6) the access token in the user profile associated with the user account. When the access token is confirmed to be valid, the collaborative playlist component 134 can send and receive data pertaining to the collaborative playlist to the multi-media application 112 (communication 7).

Periodically, collaborative playlist component 134 can confirm that the access token is still valid, and if the access token is determined to be no longer valid, the collaborative playlist component 134 can discontinue the session with the multi-media application 112.

On subsequent attempts to access the collaborative playlist by multi-media application 112, the multi-media application 112 can skip directly to requesting access to the collaborative playlist by referencing the access token (communication 5), and the collaborative playlist component 134 can determine if the access token remains valid (communication 6) as addressed above.

Because the collaborative playlist component 134 checks for a valid access token upon access and periodically during access, access to the collaborative playlist is more secure than conventional systems. At any time, the token component 130 and/or the scheduler component 132 can cause the access token to be revoked, timeout, or change the level of access associated with the second user account. As a result, even if a user has a link to the collaborative playlist or the user account is currently accessing the collaborative playlist the user account can be restricted or removed from accessing the collaborative playlist. The access to the collaborative playlist is under control of the multi-media platform 102 and the first user account (and/or other user accounts with defined privileges) that defines the access policy that permits access to the collaborative playlist.

Although FIG. 2 describes access by second user device 114 associated with a second user account, the communication flow may be the same for a first user device 110 associated with a first user account except that some first users may begin with the request for access illustrated as communication 5. Many first user accounts will already have the access token identifier from when the first user account configured the collaborative playlist and access policy initially and will not need to receive a new access token.

In some examples, in addition or as an alternative, the token component 130 can send an encrypted version of the access token to the multi-media application 112. When the access token is transferred to the multi-media application 112, the access token can be associated with a short time to live (ttl) (e.g., 1 minute, 30 minutes, 1 day) to ensure that the user account gains access through the access policy component 136 due to the access token expiring. When the user account has a valid access token, the user account is granted access to the collaborative playlist according to the permissions provided by the access token. Therefore, in examples where the access token is sent to the user device, the access token may expire regularly so that the user account requests a new one.

Figure 3:
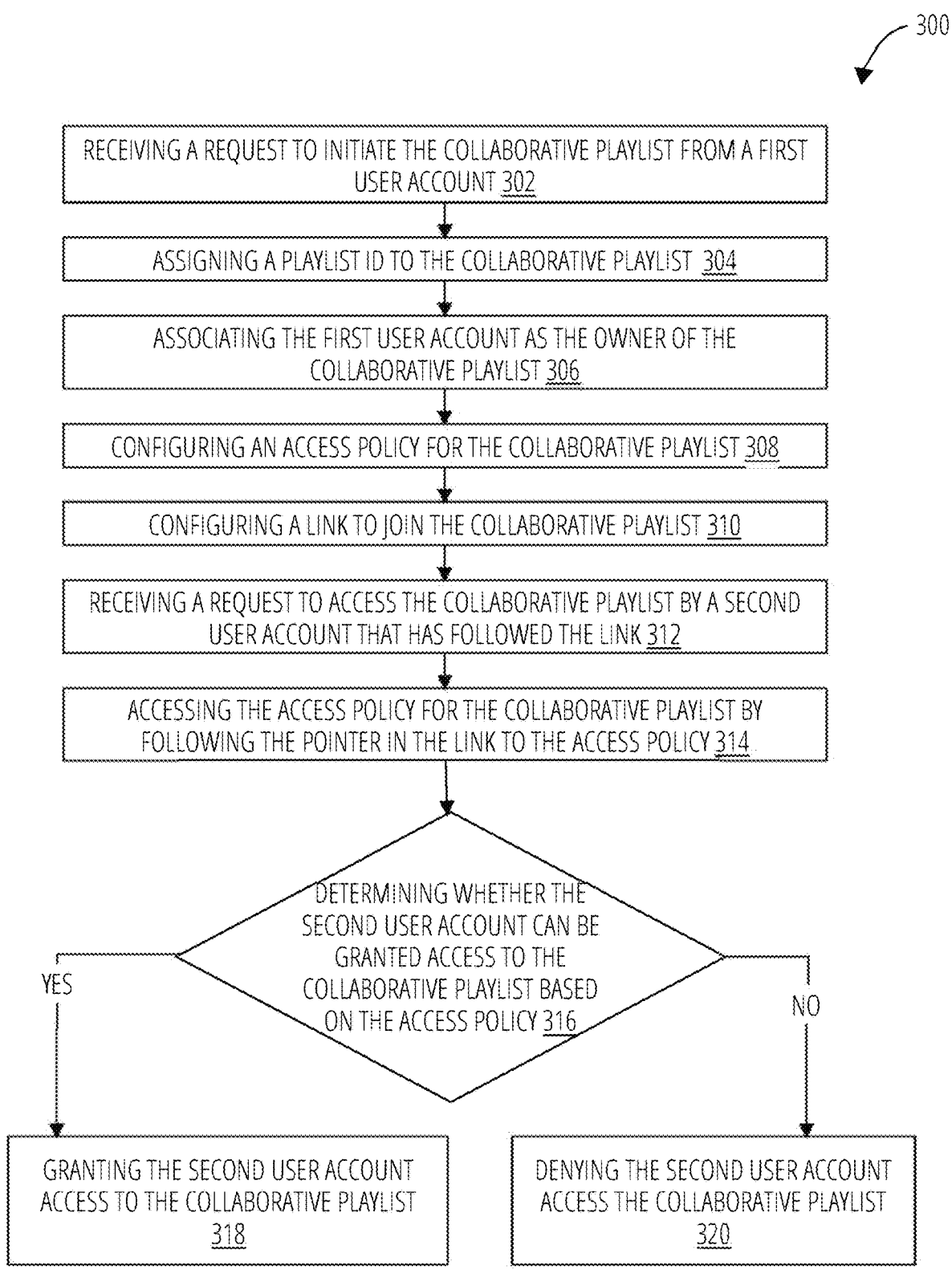
FIG. 3 illustrates an example method for creating a collaborative playlist and granting access to the collaborative playlist that utilizes access policies and access tokens to manage access to the collaborative playlist in accordance with some aspects of the present technology.

FIG. 3 illustrates an example method 300 for creating a collaborative playlist and granting access to the collaborative playlist that utilizes access policies and access tokens to manage access to the collaborative playlist. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

A collaborative playlist is a playlist that is configured to permit multiple user accounts to interact with a collaborative queue of the collaborative playlist to add content items and/or rearrange the order of the content items in the collaborative queue, and to permit user accounts to playback the content items in the collaborative playlist. In some examples, the first user account and the second user account can interact and playback the collaborative playlist asynchronously. When the interaction is asynchronous, the user accounts can access the collaborative playlist at any time and update the playlist, and/or playback the content items. The user accounts that interact with the collaborative playlist may benefit from the content item selections and arrangement chosen by those that can edit the collaborative playlist.

In some examples, the first user account and the second user account can interact and playback the collaborative playlist synchronously. When the interaction is a synchronous interaction, the collaborative playlist can be played back on user devices associated with the user accounts at substantially the same time or on designated devices that can direct the playback of the collaborative playlist through a loudspeaker, to name a few examples. Some use cases of a synchronous experience include a joint listening experience in a car playing the collaborative playlist through the car speaker system, a distributed listening experience during a live event, or perhaps by a disc-jockey (DJ) running a radio show.

According to some examples, the method begins by receiving a request to initiate the collaborative playlist from a first user account at block 302. For example, the multi-media platform 102 illustrated in FIG. 1 may receive a request to initiate the collaborative playlist from a first user account. In some examples, the first user account can be logged into their account at the multi-media platform 102 through their first user device and can interact with the instance of the multi-media application executing on the first user device to initiate and send the request to initiate the collaborative playlist.

According to some examples, the method includes assigning a playlist identifier (ID) to the collaborative playlist at block 304. For example, the multi-media platform 102 illustrated in FIG. 1 may assign a playlist ID to the collaborative playlist. In some examples, when the first user account has already created a playlist that the user wish to turn into a collaborative playlist, the playlist ID is included with the request to initiate the collaborative playlist. If no playlist ID was included in the request, the multi-media platform 102 can assign one.

According to some examples, the method includes associating the first user account as the owner of the collaborative playlist at block 306. For example, the multi-media platform 102 illustrated in FIG. 1 may associate the first user account as the owner of the collaborative playlist. The owner of the collaborative playlist can adjust the access policy for the collaborative playlist for other user accounts (as well as the owner), remove a user account from the collaborative playlist, change a role of a user account that has access to the collaborative playlist, add content items to the collaborative playlist, remove content items from the collaborative playlist, adjust the order of content items in the collaborative playlist, and/or skip playback of content items in the collaborative playlist.

According to some examples, the method includes configuring an access policy for the collaborative playlist at block 308. For example, the multi-media platform 102 illustrated in FIG. 1 may configure an access policy for the collaborative playlist. The access policy defines a plurality of user accounts, including the second user account, that are permitted to access the collaborative playlist. In some examples, the access policy can also define the role of the first user account. The access policy defines access, editing, or control rights to at least one second user. The at least one second user may be defined by a user account ID, or may be defined by a class of user accounts (e.g., new user accounts, all user accounts, user accounts with a link, user accounts within a geographic radius of a particular device or location, etc.).

In some examples, the first user account can configure the access policy by interacting with their instance of the multi-media application to interact with a media access component 104 at the multi-media platform 102. In some examples, the multi-media application can present user interfaces designed to define access policy definitions from one or more template access policies provided by the multi-media platform 102 and configure the access policy. The multi-media application can also present user interfaces designed to configure a customized access policy.

According to some examples, the method includes configuring a link to join the collaborative playlist at block 310. For example, the multi-media platform 102 illustrated in FIG. 1 may configure a link to join the collaborative playlist. Rather than providing direct access to the collaborative playlist, the link can include a reference to identify the playlist and the associated access policy. The access policy adds further security and control to the collaborative playlist. This architecture can prevent unintended link holders from being able to access the collaborative playlist because the link holder is also evaluated with respect the access policy and is granted access on the basis of the access policy rather than merely presenting the link. In some examples, an added layer of security can be provided by configuring the link to join the collaborative playlist with a time to live (TTL), wherein the link becomes invalid once the TTL expires.

According to some examples, the method includes receiving a request to access the collaborative playlist by a second user account that has followed the link at block 312. For example, the multi-media platform 102 illustrated in FIG. 1 may receive a request to access the collaborative playlist by a second user account that has followed the link.

According to some examples, the method includes accessing the access policy for the collaborative playlist by following the pointer in the link to the access policy at block 314. For example, the multi-media platform 102 illustrated in FIG. 1 may access the access policy for the collaborative playlist by following the pointer in the link to the access policy.

According to some examples, the method includes determining whether the second user account can be granted access to the collaborative playlist based on the access policy at decision block 316. For example, the multi-media platform 102 illustrated in FIG. 1 may determine whether the second user account can be granted access to the collaborative playlist based on the access policy.

According to some examples, the method includes granting the second user account access to the collaborative playlist under the access policy when conditions surrounding the request for access meet requirements specified in the access policy at block 318. The second user account is granted access by issuing the access token to the second user account that specifies the rights permitted to the second user account defined in the access policy. For example, the multi-media platform 102 illustrated in FIG. 1 may grant the second user account access to the collaborative playlist by issuing the access token to the second user account that specifies the editing or control rights permitted to the second user account defined in the access policy. The access token specifies that the access token holder can access the collaborative playlist, the type of editing privileges granted to the access token holder, and/or the control rights to be granted to the holder of the access token. In some examples, the access token includes a time to live (TTL) that defines an expiration for the access token.

According to some examples, the method includes denying the second user account access to the collaborative playlist under the access policy when conditions surrounding the request for access do not meet requirements specified in the access policy at block 320.

To provide additional security, the method of issuing the access token comprises encrypting the access token by the multi-media platform. For example, the token component 130 illustrated in FIG. 2 may encrypt the access token.

In some examples, the encrypted access token can be sent to the second user device that is associated with the second user account. In some examples, the encrypted access token is not sent to the second user account, but instead is stored by the multi-media platform. For example, the token component 130 illustrated in FIG. 2 may store the access token by the multi-media platform. When the access token is not sent to the second user device, the token component 130 can send a reference to the access token stored at the multi-media platform 102.

When the second user account wishes to establish a session to access the collaborative playlist, the multi-media platform 102 can decrypt the token, and as long as the token is still valid, the multi-media platform 102 can establish the session with the second user account using the second user device to access the collaborative playlist. In examples where the second user account is in possession of the access token, the second user account can send the encrypted access token to the token component 130 to be decrypted.

In some examples, the access token is stored at the multi-media platform 102, and the token component 130 can decrypt the token when the second user account provides a reference to the token. Storing the access token at the multi-media platform 102 without sending the access token to the second user account can provide an additional security advantage. For example, the token component 130 can modify or change the access token at any time. In some examples, the changes to the access token can be performed in response to the access policy.

The access policy specifies user accounts, including the second user account that can access the collaborative playlist. The access policy specifies a class of user accounts that includes the second user account that can access the collaborative playlist. User accounts listed in the access policy are granted access to the collaborative playlist and provided with the decrypted access token. User accounts that are determined to conform to the class of user accounts listed in the access policy are granted access to the collaborative playlist and provided with the decrypted access token.

The method can include configuring a schedule to modify or revoke the access token with a scheduler component 132. For example, the media access component 104 illustrated in FIG. 2 may configure a schedule to modify or revoke the access token with the scheduler component 132. The schedule to modify or revoke the access token is derived from the access policy where the access policy, in one implementation, defines a predefined time period to access the collaborative playlist or a change in access rights to the collaborative playlist after a time. For example, when the collaborative playlist is used for an event, the access policy can define a schedule whereby second user accounts can edit the collaborative playlist by adding content items until a deadline associated with the event, and the second user accounts can have access to an access token providing such access. The scheduler can modify the access token after the deadline has expired to modify the access token to allow the second user accounts to have read-only access to the collaborative playlist when such is defined by the access policy.

After the user account has decrypted a valid access token, the method establishes a session between the multi-media platform and the device authenticated to the second user account using the access token. For example, the token component 130 illustrated in FIG. 2 may establish a session between the multi-media platform and the device authenticated to the second user account using the access token. Access to the collaborative playlist is defined by the access token.

In addition to being granted access to the collaborative playlist, the user account can be granted a role. The access policy can define roles that are permitted to the user account and these can be listed in the access token. It can be possible for the user to have multiple roles at the same time, or for the role assigned to a user account to change.

For example, one role can be a passive listener role. The method of authenticating the second user account using the access token can include assigning the second user account a passive listener role for the collaborative playlist. The passive listener role can view the collaborative playlist and listen to playback of the collaborative playlist but cannot skip content items or vote on a playback order for content items in the collaborative playlist.

For example, one role can be a collaborate role. The method of authenticating the second user account using the access token can include assigning the second user account a collaborator role for the collaborative playlist. The collaborator role can add a content item to the collaborative playlist, remove a content item from the collaborative playlist, skip playback of a content item, or vote on a playback order for content items in the collaborative playlist.

For example, one role can be an active listener role. The method of authenticating the second user account using the access token can include assigning the second user account an active listener role for the collaborative playlist. The active listener role can view the collaborative playlist, listen to playback of the collaborative playlist, and can vote on a playback order for content items in the collaborative playlist, but cannot add content items to the collaborative playlist.

For example, one role can be a limited access role. In some cases, a limited access role may be provided to users who do not have a user account with the multi-media platform when using the access token to access the collaborative playlist. The limited access role may provide temporary and/or limited functionality associated with the collaborative playlist without the user creating a user account on the multi-media platform. Thus, in some instances, a user having a limited access role may have access to functionality associated with the collaborative playlist, the user having the limited access role may be prevented from accessing other functionality (e.g., streaming, downloading, etc.) provided by the multi-media platform to users that have created user accounts. Further, the method of authenticating the second user account using the access token can include assigning the temporary account a limited access role. The temporary account can view the collaborative playlist, and may receive a limited number of media item playbacks, and cannot vote for content items to play sooner.

One use case that can further illustrate the function of the access policy and the access token with various roles is when a collaborative playlist is used for an event, for example, a party. The access token provides a limited period of access to the collaborative playlist such that the second user account can add content items to the collaborative playlist during the limited period, and after the limited period, the access token provides the second user account with a passive listener role. The limited period of access to the collaborative playlist corresponds to the beginning of an event, the party. Further, another access token provides a third user account with permissions to control playback of the media items in the collaborative playlist for a period. For example, the third user account can be a DJ that can control playback of the collaborative playlist during the party. After the party, user accounts that had access to the collaborative playlist can view the collaborative playlist for asynchronous playback, but are not permitted to edit the collaborative playlist.

Figure 4:
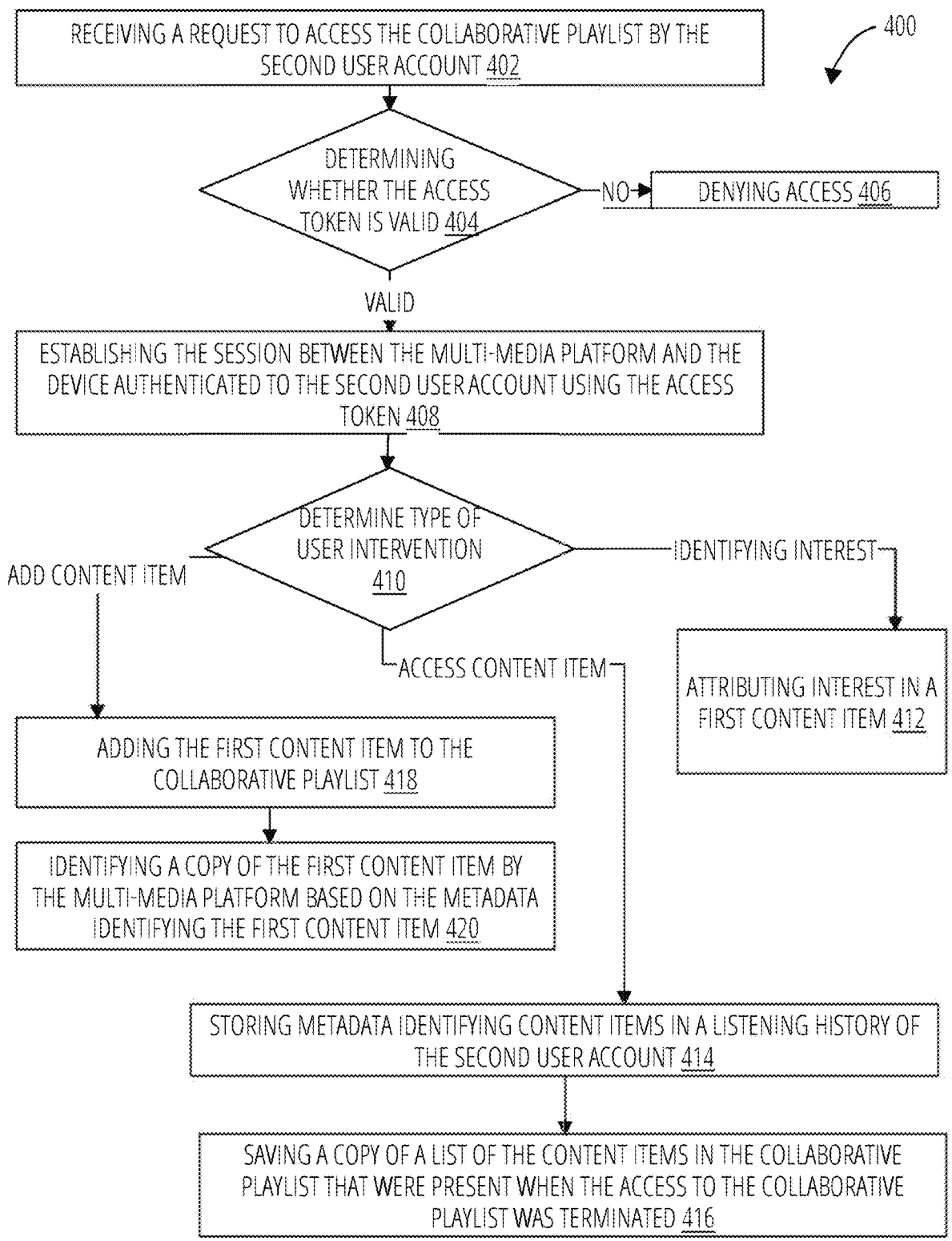
FIG. 4 illustrates an example method for receiving interactions with the collaborative playlist from a second user account in accordance with some aspects of the present technology.

FIG. 4 illustrates an example method 400 for receiving interactions with the collaborative playlist from a second user account. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes receiving a request to access the collaborative playlist by the second user account at block 402. For example, the multi-media platform 102 illustrated in FIG. 2 may receive a request to access the collaborative playlist by the second user account. The request to access the collaborative playlist includes the access token or a reference to the access token.

According to some examples, the method includes determining whether the access token is valid at decision block 404. For example, the token component 130 illustrated in FIG. 2 may determine whether the access token is valid. When the access token is valid, the second user account can establish a session with the multi-media platform 102 at block 408. When the access token is not valid, the token component 130 can deny access to the second user account at block 406.

According to some examples, the method includes establishing the session between the multi-media platform and the device authenticated to the second user account using the access token at block 408. For example, using the access token, the multi-media platform 102 illustrated in FIG. 2 may establish the session between the multi-media platform and the device authenticated to the second user account.

In some examples, the session can be a two-way, interactive communication session between the multi-media platform and a second user device from which the second user account has authenticated with the multi-media platform. The second user device can receive near real-time updates regarding commands to control the playback of the collaborative playlist and/or updates regarding content items included in the collaborative playlist.

According to some examples, once a session is established, the method includes determining a type of user interaction by the second user account with the collaborative playlist at decision block 410. For example, the multi-media platform 102 illustrated in FIG. 2 may determine a type of user interaction by the second user account with the collaborative playlist. Examples of types of user interactions may include, but are not limited to, requests to add a content item to the collaborative playlist, requests to attribute an action that indicates interest in a content item included in the collaborative playlist to the second user account, and requests to access a content item included in the collaborative playlist.

In some examples, when the multi-media component 102 determines that the user interaction identified at decision block 410 includes adding, by the second user account, a content item to the collaborative playlist, the method may include receiving the request from the second user account to add a first content item to the collaborative playlist, and adding the first content item to the collaborative playlist at block 418. For example, the multi-media platform 102 illustrated in FIG. 2 may receive a request from the second user account to add a first content item to the collaborative playlist, and can add the first content item to the collaborative playlist. The request includes metadata identifying the first content item. The metadata can include a content item identifier, an artist name, and/or a title. The multi-media component 102 can, in some embodiments, recommend content items eligible for addition to the collaborative playlist. For example, the multi-media component 102 can, using machine learning models, recommend select content items that are capable of being streamed on a specific hardware device or a specific software application. In some examples, the recommendation may be tied to preferences of the first or second user account. In yet other examples, the recommendation may be dependent on whether the first user account is authorized to access the content intended to be added.

According to some examples, the method includes identifying an instance of the first content item in media content 106 at data store 108 by the multi-media platform based on the metadata identifying the first content item at block 420. For example, the multi-media platform 102 illustrated in FIG. 2 may identify an instance of the first content item by the multi-media platform based on the metadata identifying the first content item.

Further, the step of adding the first content item to the collaborative playlist may comprise attributing the second user account with adding the first content item to the collaborative playlist as addressed with respect to block 414, below. For example, multi-media platform 102 may attribute the second user account with adding of the first content item to the collaborative playlist.

In some examples, if the multi-media component 102 determines that the user interaction identified at decision block 410 by the second user account includes performing an action that indicates interest in a content item included in the collaborative playlist, the method may include attributing the interest in the content item by the second user account at block 414. For instance, actions that indicate interest can take the form of voting (upvoting) for a content item to be played earlier in the collaborative playlist than the current position of the content item in the playlist, favoriting, and/or adding the content item to the collaborative playlist. Content items for which a user account has indicated interest can be recorded in the user profile of the user account in data store 108. Recording the content item in the user profile in data store 108 can allow the user account to subsequently reference the content items the user account indicated an interest in and may be used by machine learning component 1126 illustrated in FIG. 11 to perform analysis on the user profile.

For example, the multi-media platform 102 illustrated in FIG. 2 may receive an indication of interest in a first content item in the collaborative playlist from the second user account. In some examples, the indication of interest can be that the second user account added the second content item to the collaborative playlist and/or that the second user account voted for the content item to be promoted in an order of content items in the collaborative playlist.

In some cases, if the multi-media component 102 determines that the user interaction identified at decision block 410 by the second user account includes listening to a content item in the collaborative playlist, the method may include storing metadata identifying content items in a listening history of the second user account when the content items in the collaborative playlist were played back while the second user account was accessing the collaborative playlist at block 414. Content items that a user account has listened to can be stored in a listening history associated with a user profile in the data store 108 for later reference by the user account. The stored listening history can be used by machine learning component 1126 illustrated in FIG. 11 to perform analysis on the user profile. For example, the multi-media platform 102 illustrated in FIG. 2 may store metadata identifying content items in a listening history of the second user account in data store 108 when the content items in the collaborative playlist were played back while the second user account was accessing the collaborative playlist.

Sometimes a user account may want to be able to playback content items that were in a collaborative playlist that the user account no longer has access to base on the access policy applied to the user account. While the user account can no longer make changes that will be shared with the other members of the collaborative playlist, the user account may want the content items included in the collaborative playlist for their own experience. According to some examples, the method includes saving an instance of a list of the content items in the collaborative playlist that were present when the access to the collaborative playlist was terminated at block 416. For example, the multi-media platform 102 illustrated in FIG. 2 may save an instance of a list of the content items in the collaborative playlist in the user profiles 122 of the data store 108 that were present when the access to the collaborative playlist was terminated. The user account can access the list of content items through their user account with the multi-media platform 102.

Figure 5A:
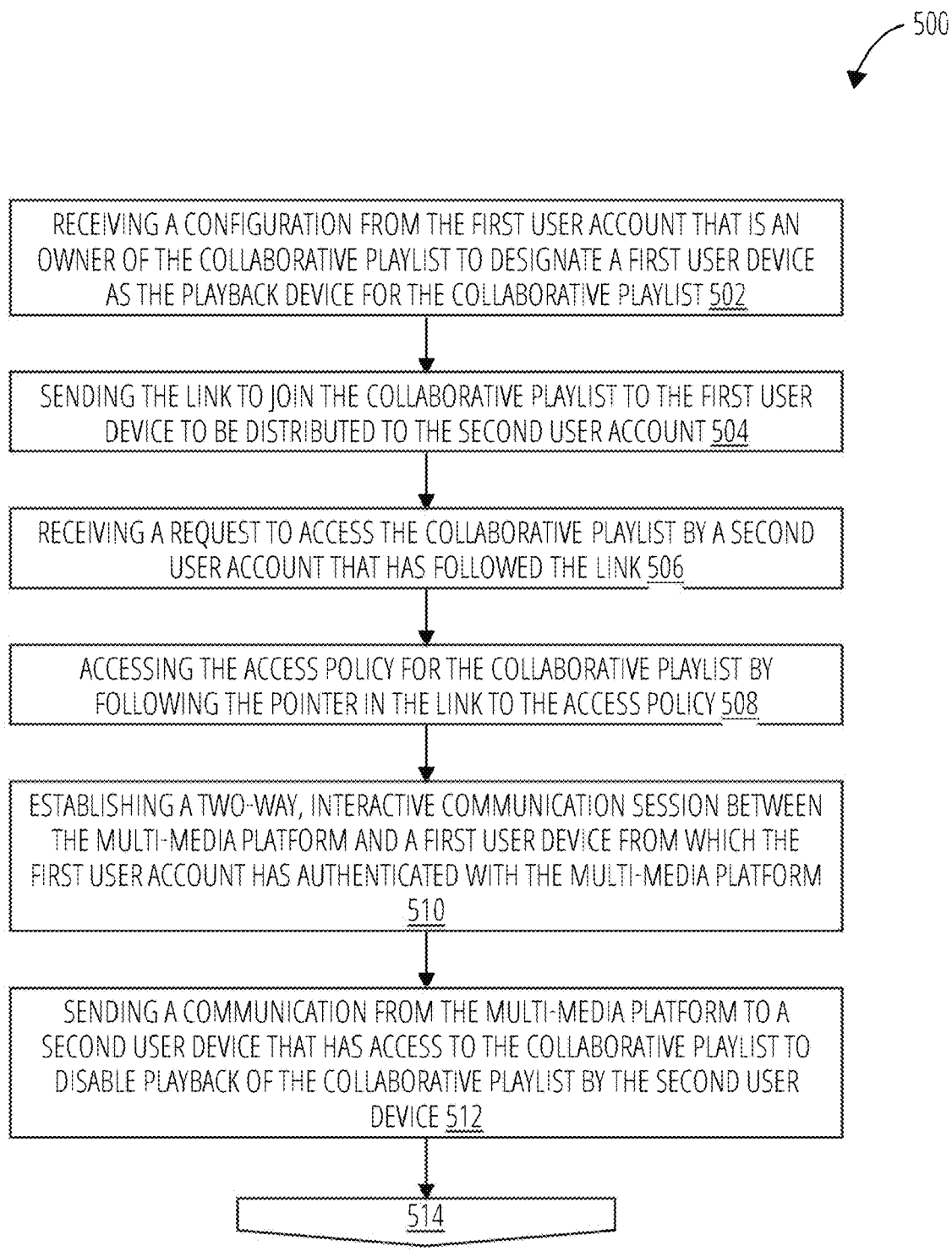
FIG. 5A and FIG. 5B illustrate an example method for a synchronous experience with a collaborative playlist where the playback of content items is through a designated device that plays the content items through a loudspeaker in accordance with some aspects of the present technology.
Figure 5B:
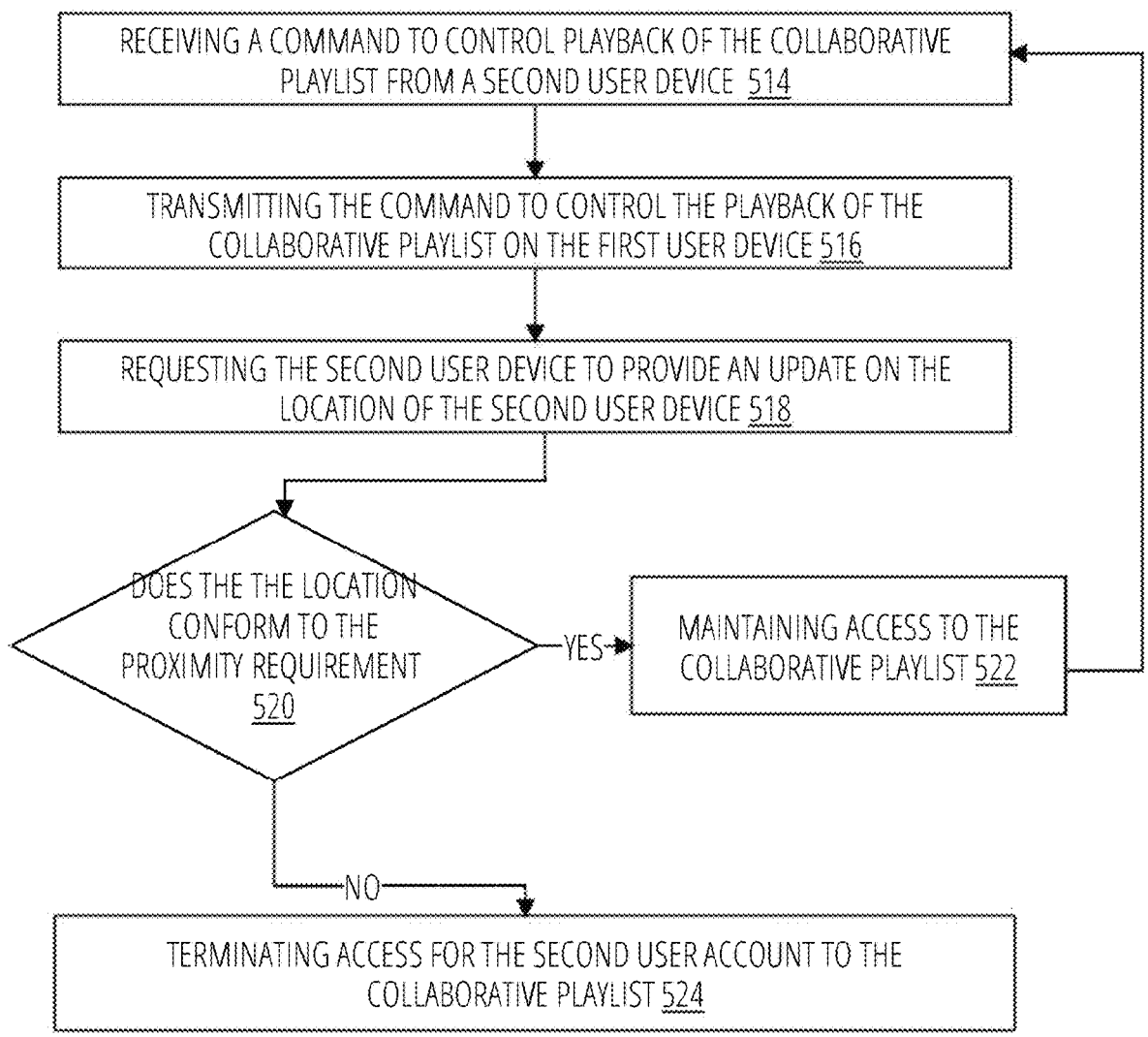

FIG. 5A and FIG. 5B illustrate an example method 500 for a synchronous experience with a collaborative playlist where the playback of content items is through a designated device that plays back the content items through a loudspeaker. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

In some examples, some users will be physically proximate to one another and desire to listen to a collaborative playlist together through a loudspeaker rather than experiencing the playback of content items on their respective user devices. In one example, the users could be traveling together in a car where a designated device can be connected to the car audio system.

According to some examples, the method includes receiving a configuration from the first user account that is an owner of the collaborative playlist to designate a first user device as the playback device for the collaborative playlist at block 502. For example, the multi-media platform 102 illustrated in FIG. 2 may receive a configuration from the first user account that is an owner of the collaborative playlist to designate a first user device as the playback device for the collaborative playlist. The first user device is linked to an audio system including a loudspeaker, such as a car speaker, stereo receiver, or Bluetooth speaker.

According to some examples, the method includes sending an interactive element, e.g., a hyperlink, a uniform resource location (URL), a quick response (QR) code, etc., to join the collaborative playlist to the first user device to be distributed to the second user accounts by the first user account on the first user device at block 504. For example, the multi-media platform 102 illustrated in FIG. 2 may send the interactive element via an email, text message, or posting on social media, etc. to join the collaborative playlist to the first user device to be distributed to the second user accounts by the first user account on the first user device. In some examples, the first user account can also invite the second user accounts to access the playlist through the multi-media platform 102, which can send messages such as in app messages, email messages, text messages, notification, etc. including the interactive element to the second user accounts with instructions to join the collaborative playlist.

In some examples, the second users can interact with their instances of the multi-media application of the second user device and request to obtain access to a collaborative playlist that is being hosted by a designated first user device that is proximate to the second user device. The second user device can learn of the proximate first user device through communication with the multi-media platform 102 or through detecting a low-power Bluetooth signal emitted from the first user device that includes the interactive element, to name a few examples.

According to some examples, the method includes receiving a request to access the collaborative playlist by a second user account that has followed the interactive element at block 506. For example, the multi-media platform 102 illustrated in FIG. 2 may receive a request to access the collaborative playlist by a second user account that has engaged with the interactive element or other access instructions such as a notification presented by an application (e.g., the multi-media application 112 or a different application) or download of a widget or an instant of the application through which the playlist or specific content is accessible.

According to some examples, the method includes accessing the access policy for the collaborative playlist by following the pointer in the interactive element to the access policy at block 508. For example, the multi-media platform 102 illustrated in FIG. 2 may access the access policy for the collaborative playlist by following the pointer in the interactive element to the access policy. In some examples, the access policy specifies a location or geofence where the second user device is to be proximate to the location to access the collaborative playlist. In some examples, the access policy specifies that the second user device be proximate to a first user device authenticated to the first user to access the collaborative playlist. For example, when an access policy applies to a car environment, the threshold could be 3-meters, or in the case of a party the threshold could be 100 meters.

In some examples, the second user device attempting to access the collaborative playlist can report that the second user device is located near the location or near the first user device and be granted access to the collaborative playlist. For example, when the second user device requests access to the collaborative playlist, the second user device can send global positioning system (GPS) coordinates to the multi-media platform 102.

According to some examples, the method includes establishing a two-way, interactive communication session between the multi-media platform and a second user device from which the second user account has authenticated with the multi-media platform at block 510. For example, the multi-media platform 102 illustrated in FIG. 2 may establish a two-way, interactive communication session between the multi-media platform and the second user device. The multi-media platform 102 can also be engaged in a two-way, interactive communication session between the multi-media platform and the first user device. The two-way, interactive communication session may provide, both the first user device and the second client device(s), near real-time updates regarding commands to control the playback of the collaborative playlist or updates regarding content items included in the collaborative playlist. For example, the two-way interactive communication session can transmit data regarding playback commands provided by the second user device to the multi-media platform 102, and the multi-media platform 102 can transmit data regarding current playback status of the collaborative playlist to the second user device. Likewise, the two-way interactive communication session can transmit data regarding playback commands provided by the first user device to the multi-media platform 102, and the multi-media platform 102 can transmit data regarding current playback status of the collaborative playlist to the first user device. The multi-media platform 102 can also use the two-way interactive communication sessions with the first user device and the second user device to receive commands from one device (for example, the second user device) and send the commands to the other client device (for example, the first user device).

According to some examples, the method includes sending a communication from the multi-media platform to a second user device from which the second user account has authenticated with the multi-media platform that has access to the collaborative playlist to disable playback of the collaborative playlist by the second user device at block 512. For example, the multi-media platform 102 illustrated in FIG. 2 may send a communication from the multi-media platform to the second user device to disable playback of the collaborative playlist by the second user device. Disabling playback by the second device can prevent the second device from inadvertently playing a content item and/or interfering with the playback of the content item played over the loudspeaker.

According to some examples, the method includes receiving a command to control playback of the collaborative playlist from the second user device at block 514. For example, the multi-media platform 102 illustrated in FIG. 2 may receive a command to control playback of the collaborative playlist from the second user device. In some examples, the first user account can veto the command, or other second user accounts can vote on whether the command should be applied.

According to some examples, the method includes transmitting the command to control the playback of the collaborative playlist to the first user device that is designated as the playback device at block 516. For example, the multi-media platform 102 illustrated in FIG. 2 may transmit the command to control the playback of the collaborative playlist to the first user device, and the first user device can respond to the command to control the playback of the collaborative playlist. In some examples, example commands include a command to skip a content item, a command to play or pause a content item, or a command to add a content item to the collaborative playlist, or the command can be a vote for a content item.

Since the access policy for this use case defines a proximity of the second user devices to the first user device, the method may include periodically requesting the second user device to provide an update on the second user device's location at block 518. For example, the multi-media platform 102 illustrated in FIG. 2 may request the second user device to provide an update on the location of the second user device.

In some examples, the method determines whether the location received in response to the request at block 518 conforms to the proximity requirement defined in the access policy at decision block 520.

According to some examples, if the multi-media platform 102 determines that the location received in response to the request conforms to the proximity requirement defined in the access policy at decision block 520, the method includes maintaining access to the collaborative playlist by the second user device at block 522. For example, the multi-media platform 102 can continue to listen for commands to control playback of the collaborative playlist from the second user device.

According to some examples, if the multi-media platform 102 determines that the location received in response to the request fails to conform to the proximity requirement defined in the access policy at decision block 520, the method includes terminating access for the second user account to the collaborative playlist at block 524. For example, the multi-media platform 102 illustrated in FIG. 2 may terminate access for the second user account to the collaborative playlist when the update on the location of the second user device indicates that the second user device is more than 3 meters away from the first user device, which would indicate that the second user is no longer in the car with the first user, or that the second user is more than 100 meters away which indicates the second user is not at the same location as the first user.

Figure 6:
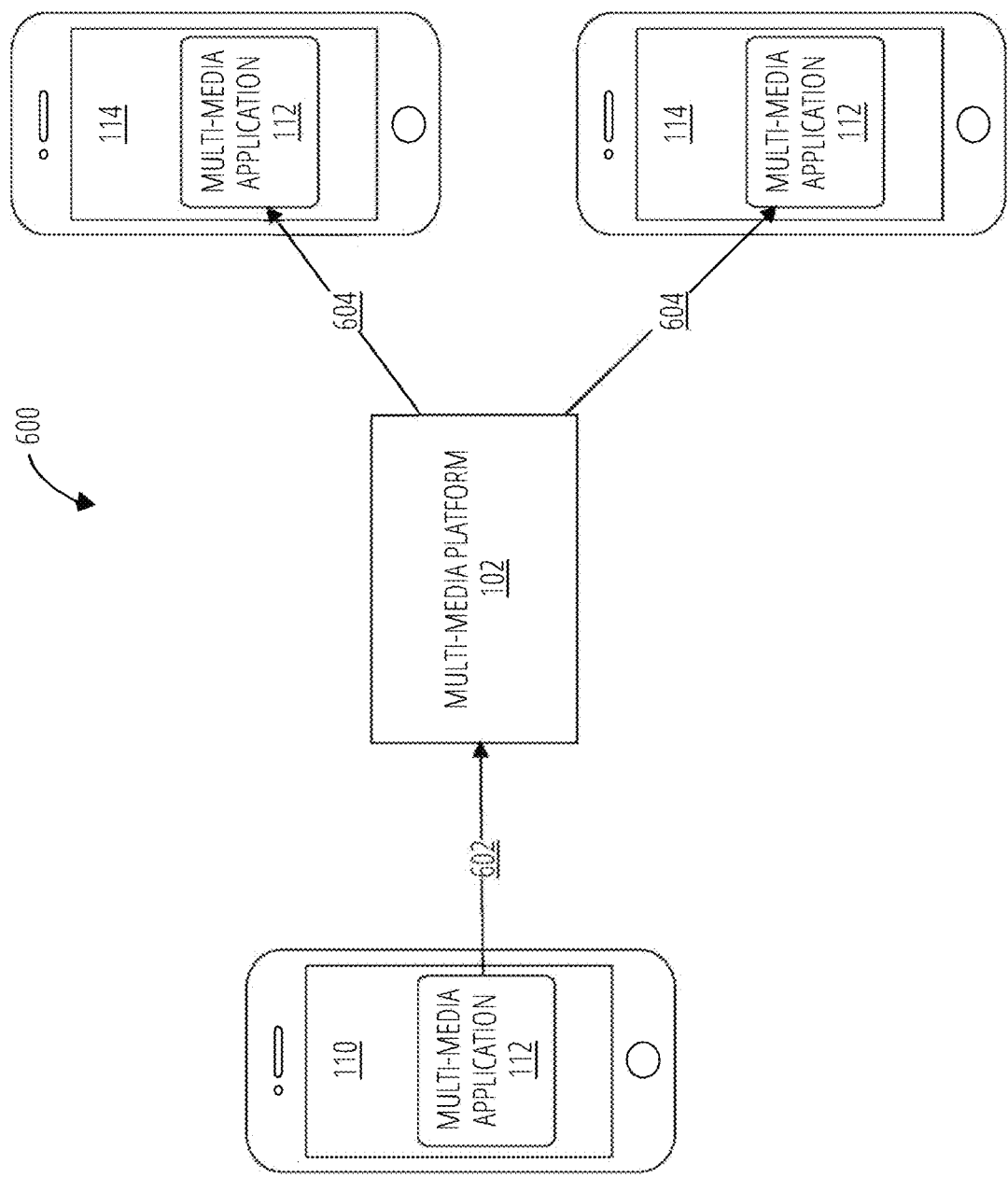
FIG. 6 illustrates an example environment for an asynchronous experience with a collaborative playlist in accordance with some aspects of the present technology.

FIG. 6 illustrates an example environment 600 for an asynchronous experience with a collaborative playlist.

The collaborative playlist can be a synchronous playlist that is played back on the user devices of the first user account and the second user accounts, whereby the first user account and the second user accounts playback content items in the collaborative playlist of their devices synchronously.

According to some examples, the multi-media platform 102 illustrated in FIG. 6 may receive a command 602 to control playback of the collaborative playlist from the multi-media application 112 of the first user device 110. While FIG. 6 shows the command 602 to control playback of the collaborative playlist originating from the first user device 110, any of the first user device 110 or second user devices 114 can receive the command to control playback and send a communication to the multi-media platform 102.

According to some examples, the multi-media platform 102 illustrated in FIG. 6 may forward the command 604 to control the playback of the collaborative playlist to the multi-media application 112 of the second user devices 114 of user accounts that have access to the collaborative playlist.

While FIG. 6 illustrates an environment where user devices send commands to the multi-media platform 102 to be forwarded to other devices, a peer-to-peer environment could also be utilized where the first user device 110 can send the command directly to the other user devices such as second user devices 114.

In some examples, example commands include a command to skip a content item, a command to play or pause a content item, a command to add a content item to the collaborative playlist, or the command can be a vote for a content item. The first user device receiving the command from the multi-media platform 102 can respond to the command to control the playback of the collaborative playlist.

The transmitted commands can be pushed to the user devices with an active session with the collaborative playlist, and the user devices can promptly execute the command. A user is engaged in an active session when the user both has access to the collaborative playlist and the user has recently (e.g., within the last 1 hour, the 30 minutes, last 10 minutes, etc.) with the collaborative playlist. In this way, the user devices receiving the command can participate in a synchronous experience with the collaborative playlist. By synchronous, it is meant that the user devices will execute the commands at approximately the same time such that all of the user devices will playback the same content item at approximately the same time. In this way, users in distributed geographic locations can share an experience of participating in a collaborative playlist with one another.

Figure 7:
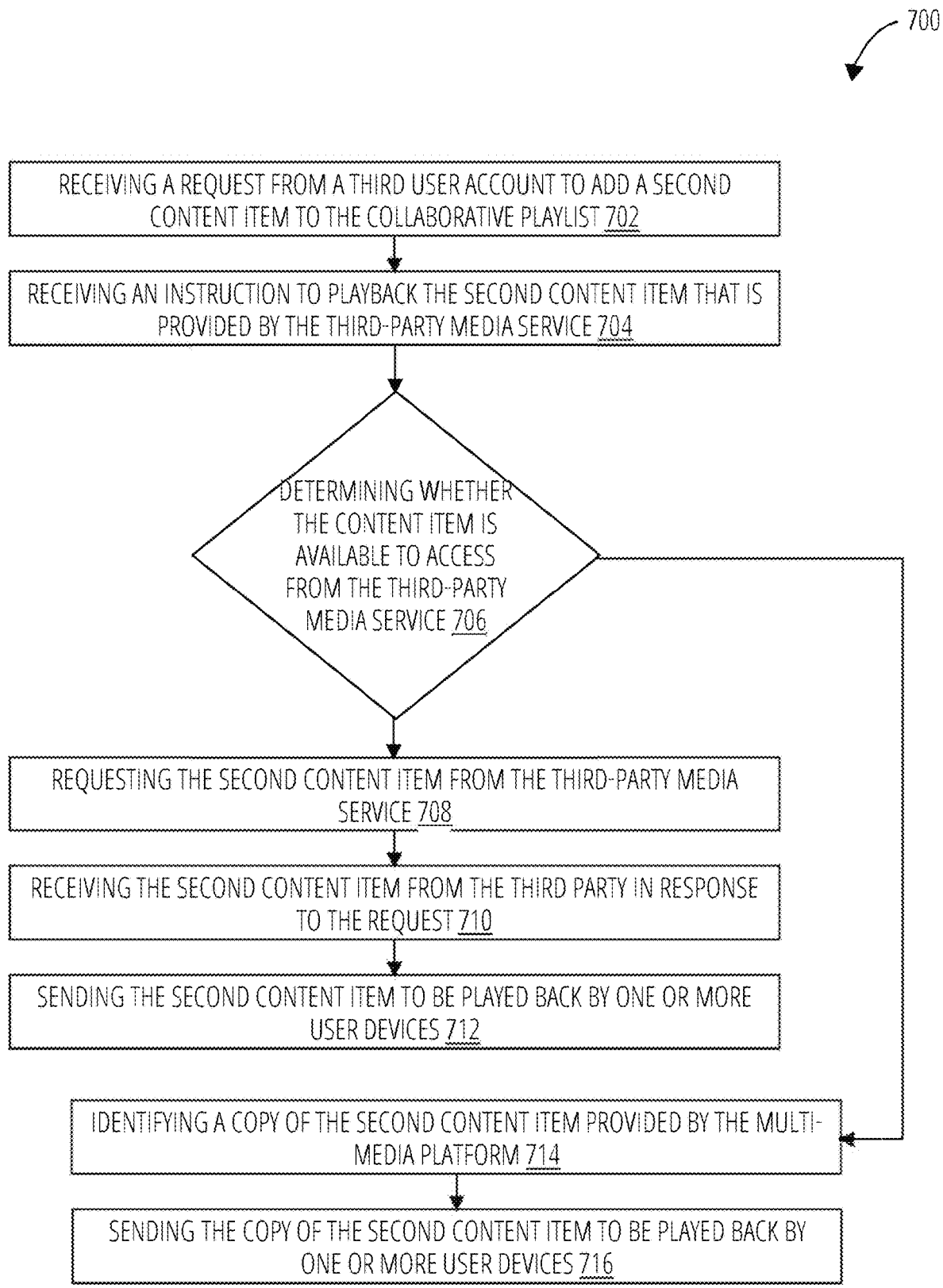
FIG. 7 illustrates an example method for managing a collaborative playlist with content items added from the multi-media platform and a third-party media service in accordance with some aspects of the present technology.

FIG. 7 illustrates an example method 700 for managing a collaborative queue with content items added from the multi-media platform 102 and a third-party media service. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

The present technology can provide access to a collaborative playlist to user accounts of a third-party media service. This functionality can expand a list of potential users that can interact with a collaborative playlist. For example, a first user account can create a collaborative playlist. Additionally, in some examples, the first user account may invite a second user account that has an account at the multi-media platform 102 and invite a third user account that has an account at a third-party media service, other than the multi-media platform 102.

According to some examples, the method includes receiving a request from the third user account that has the account at the third-party media service to add a second content item to a collaborative queue that is part of the collaborative playlist at block 702. The request includes metadata identifying the second content item. The collaborative queue of the collaborative playlist is managed and hosted by the multi-media platform 102. For example, the multi-media platform 102 illustrated in FIG. 1 may receive a request from the third user account to add the second content item to the collaborative playlist. The collaborative queue can include a first content item provided by the multi-media platform, whereas the second content item is provided by the third-party media service.

In some examples, the multi-media platform 102 utilizes an API to browse a content catalog of the third-party media service based on the metadata identifying the second content item received in the request (at block 702). The metadata includes a second content item identifier, a second artist name, and/or a second title.

According to some examples, the method includes receiving an instruction to playback the second content item that is provided by the third-party media service at block 704. For example, the multi-media platform 102 illustrated in FIG. 2 may receive an instruction to playback the second content item that is provided by the third-party media service.

According to some examples, the method includes determining whether the content item is available to access from the third-party media service at decision block 706. For example, the multi-media platform 102 illustrated in FIG. 2 may determine whether the content item is available to access from the third-party media service.

According to some examples, when the content item is available to access from the third party media service, the method includes requesting the second content item from the third-party media service at block 708. For example, the multi-media platform 102 illustrated in FIG. 2 may request the second content item from the third-party media service.

According to some examples, the method includes receiving the second content item from the third-party media service in response to the request at block 710. For example, the multi-media platform 102 illustrated in FIG. 2 may receive the second content item from the third-party media service in response to the request.

According to some examples, the method includes sending the second content item to be played back by one or more user devices at block 712. For example, the multi-media platform 102 illustrated in FIG. 2 may send the second content item to be played back by one or more user devices.

In some examples, rather than playing the second content item from the third-party media service from which it was added, the multi-media platform 102 can playback the second content item, or a similar instance of the second content item from the multi-media platform's 102 catalog of content items. The multi-media platform 102 can playback the second content item when the content item is not available to access from the third party media service as determined at decision block 706, or when a contractual or content item licensing right causes the multi-media platform 102 to playback the content item. According to some examples, the method includes identifying an instance of the second content item provided by the multi-media platform at block 714. For example, the multi-media platform 102 illustrated in FIG. 2 may identify an instance of the second content item provided by the multi-media platform. The instance may not be an exact match using a fuzzy matching technique.

According to some examples, the method includes sending the instance of the second content item to be played back by one or more user devices at block 716. For example, the multi-media platform 102 illustrated in FIG. 2 may send the instance of the second content item to be played back by one or more user devices.

Figure 8A:
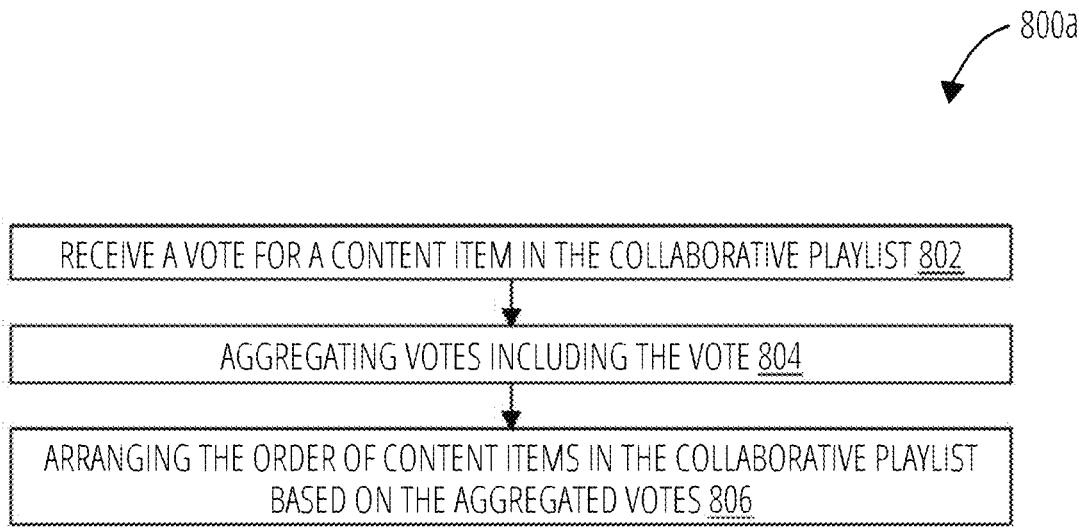
FIG. 8A and FIG. 8B illustrate example methods for arranging an order of content items in a collaborative playlist in accordance with some aspects of the present technology.
Figure 8B:
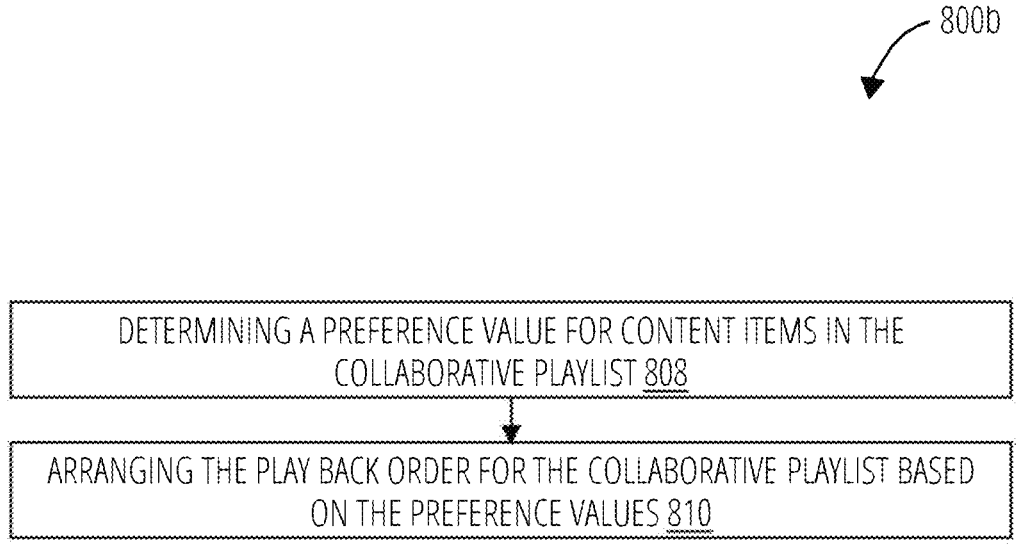

FIG. 8A and FIG. 8B illustrate an example method 800*a* and method 800*b* for arranging an order of content items in a collaborative queue of a collaborative playlist. Although the example method 800*a* and method 800*b* depicts a particular sequence of operations, the sequence may be altered without departing from the scope of the present disclosure. For example, some of the operations depicted may be performed in parallel or in a different sequence that does not materially affect the function of the method 800*a* and method 800*b*. In other examples, different components of an example device or system that implements the method 800*a* and method 800*b* may perform functions at substantially the same time or in a specific sequence.

One aspect of a collaborative queue is that user accounts that have access to the collaborative queue may not all agree on what content items to include and what order to playback the media content items. There are a number of ways to manage these scenarios including through policies or through administrator management. One way of managing these scenarios is through feedback from user accounts. One type of feedback can be through voting. Another type of feedback can be by using algorithms to identify content items that best match a taste profile of the user accounts that are members of the collaborative queue.

According to some examples, the method 800*a* includes receiving a vote for a content item in the collaborative queue from the second user account at block 802. For example, the multi-media platform 102 illustrated in FIG. 2 may receive a vote for a content item in the collaborative queue from the second user account. In some examples, the vote is an indication of support for the content item to be played back prior to other content items in the collaborative queue (an up-vote). In some examples, the vote is to skip playback of a content item or delete it from the collaborative queue altogether.

In some examples, a user account may receive a limited number of votes, or a number of votes may be allotted to the user account over a time period. In some examples, the vote is a monetary contribution of a particular value.

In some examples, the vote may include a value indicating a strength of the vote. For example, a user may use multiple of their allotted votes to support a desired action for a content item, or a user may provide a larger monetary contribution to provide greater support to their vote.

In some examples, a user account that does not skip or vote often can get priority to skip or priority to upvote or their vote can receive an increased weight. In some examples, the voting can trigger remediation paths, e.g., to trigger a fuzzy finder and detect "similar" songs, e.g., songs similar in tempo, musicality, similar singer, etc.

According to some examples, the method includes aggregating votes including the vote from the second user account along with votes from other user accounts at block 804. For example, the multi-media platform 102 illustrated in FIG. 2 may aggregate votes including the vote from the second user account and other user accounts. In an illustrative example, the multi-media platform 102 may aggregate votes to play back a first content item next in the collaborative playlist from a first subset of user accounts with access to the collaborative playlist, aggregate votes to play back a second content item next in the collaborative playlist from a second subset of user accounts with access to the collaborative playlist, and so on.

According to some examples, the method includes arranging the order of content items in the collaborative queue based on the aggregated votes at block 806. For example, the multi-media platform 102 illustrated in FIG. 2 may arrange the order of content items in the collaborative queue based on the aggregated votes. The content item receiving the greatest total of up-votes is promoted to the top of the order of content items in the collaborative queue, or is skipped from playback after exceeding a vote threshold to skip playback of a content item.

In some examples, the multi-media platform 102 can automatically arrange or skip content items in the collaborative playlist according to analytics performed on user accounts that have access to the collaborative playlist.

According to some examples, the method includes determining a preference value for content items in the collaborative queue at block 808. For example, the multi-media platform 102 illustrated in FIG. 2 may determine a preference value for content items in the collaborative queue. The preference value reflects an average or aggregate score reflecting a preference of a group of user accounts that are members of the collaborative queue for individual content items in the collaborative playlist. The preference of a user account for a content item or genre of content items can be determined based on content items that have been added to a collection associated with the user account, content items that have been "liked", content items that have been played back more often than other content items, etc. In some aspects, data associated with the user account can be fed into a collaborative filtering algorithm to identify other content items that the user account probably likes based on the data associated with the user account.

In some examples, the multi-media platform 102 illustrated in FIG. 2 may average individual preference scores for the user accounts for respective individual content items to result in an average preference value for respective individual content items.

In some examples, the multi-media platform 102 illustrated in FIG. 2 may create a cluster of the user accounts that are members of the collaborative queue in an embedding space that combines user accounts with content items. The multi-media platform 102 may determine a proximity value between a centroid of the cluster of user accounts to the respective individual content items. The closer to an individual content item, the stronger the preference score.

In some examples, the multi-media platform 102 illustrated in FIG. 2 may average the weights between respective user accounts and respective media items to result in an average preference value for respective individual content items. In some examples, the weights between the user accounts and the media items can be represented in a graph. Each link between a user account and an individual content item includes a weight that represents a preference for the content item by the user account.

According to some examples, the method includes arranging the playback order for the collaborative playlist based on the preference values at block 810. For example, the multi-media platform 102 illustrated in FIG. 2 may arrange the playback order of the content items in the collaborative queue for the collaborative playlist based on the preference values.

Figure 9:
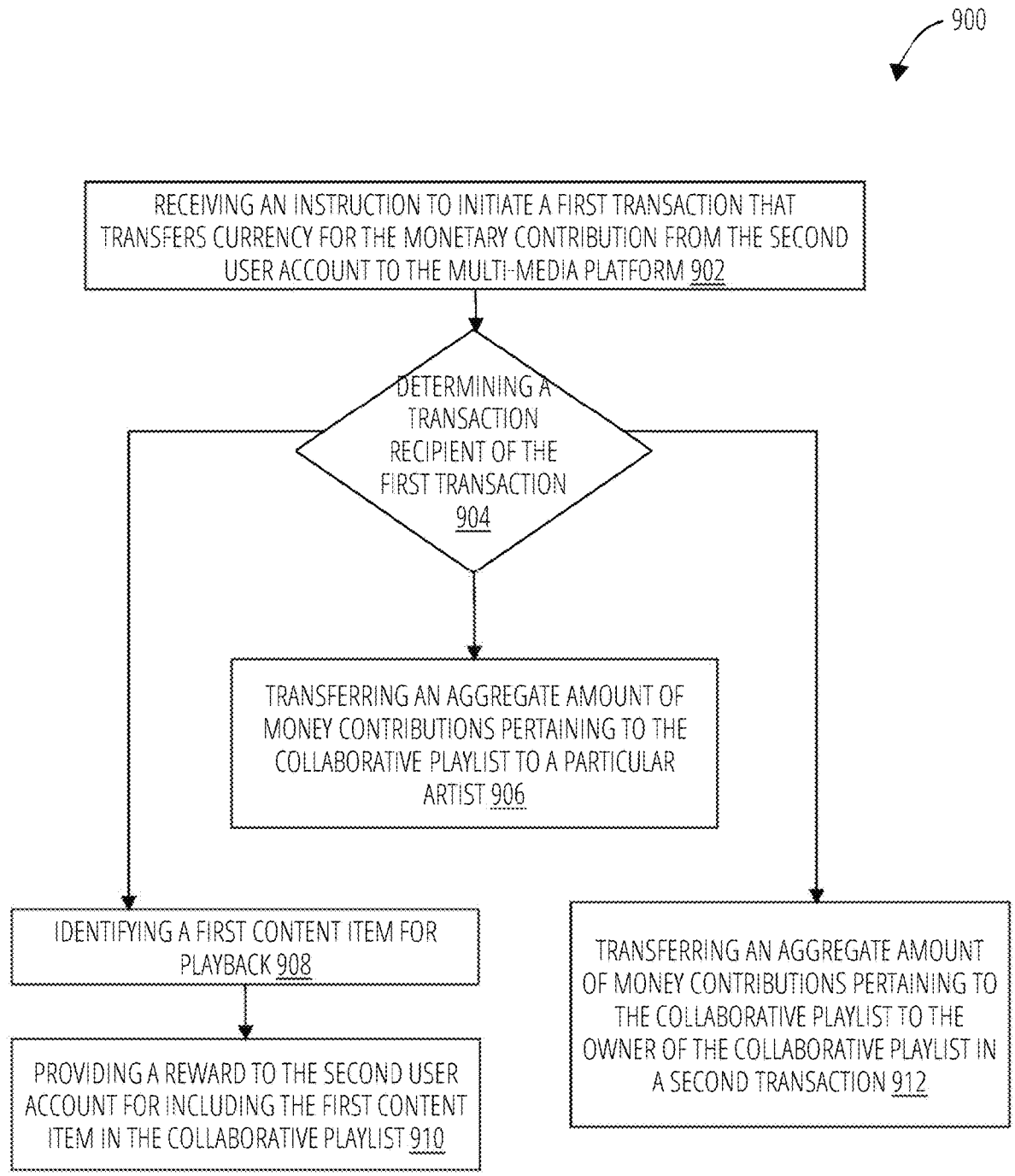
FIG. 9 illustrates an example method for receiving and transferring monetary contributions associated with a collaborative playlist in accordance with some aspects of the present technology.

FIG. 9 illustrates an example method 900 for receiving and transferring monetary contributions associated with a collaborative playlist. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence.

As addressed above, user accounts may provide monetary contributions associated with a vote on a content item in the collaborative queue. User accounts may provide monetary contributions for other reasons too. User accounts may desire to tip the first user account that is the owner of the collaborative playlist, or user accounts may make monetary contributions in exchange for adding content items to the collaborative queue.

In some examples, the collaborative playlist can be associated with a promise or policy that contributions will be dispersed. The first user account may promise to transfer funds to a charity or may configure a policy whereby second user accounts get rewarded for adding a content item to the collaborative queue that gets upvoted and played or that monetary contributions will be passed on to a particular artist.

According to some examples, the method includes receiving an instruction to initiate a first transaction that transfers currency for the monetary contribution from the second user account to the multi-media platform at block 902. For example, the multi-media platform 102 illustrated in FIG. 2 may receive an instruction to initiate a first transaction that transfers currency for the monetary contribution from the second user account to the multi-media platform.

In some examples, the method includes determining a transaction recipient of the first transaction at decision block 904. Transaction recipients may include an artist of a media item included in a collaborative playlist, a playlist owner of a collaborative playlist, and/or a user account that contributed a particular content item to a collaborative playlist, to name a few examples. For example, the multi-media platform 102 illustrated in FIG. 2 may determine the transaction recipient of the first transaction. In some examples, the transaction recipient can be determined from a configuration of the collaborative playlist. For example, the collaborative playlist might be configured with a rule to send monetary contributions to the artist of a media item included in a collaborative playlist, the playlist owner of a collaborative playlist, and/or the user account that contributed a particular content item to a collaborative playlist. In another example, the transaction recipient can be selected by the second user account.

In response to the multi-media platform 102 determining that the transaction recipient is an artist at decision block 904 the method may include transferring an aggregate amount of money contributions pertaining to the collaborative playlist to a particular artist at block 906. For example, the multi-media platform 102 illustrated in FIG. 2 may transfer an aggregate amount of monetary contributions pertaining to the collaborative playlist to a particular artist. The transfer to the artist can include receiving an instruction to transfer a portion of the aggregate amount of monetary contributions to a particular artist. The multi-media platform 102 illustrated in FIG. 2 may transfer currency for the monetary contribution associated with a particular content item to an artist associated with the particular content item based on a currency access policy configured by the owner of the collaborative playlist. For example, the multi-media platform 102 illustrated in FIG. 2 may transfer an aggregate amount of money contributions pertaining to the monetary contributions from upvotes for the particular content item to the particular artist.

Whatever the reason for which monetary contributions are provided, it may be desired to provide visibility on the ultimate destination of the monetary contributions, especially when those monetary contributions are motivated by a promise or policy set by the first user account. Accordingly, the multi-media platform 102 illustrated in FIG. 2 may record a record of the monetary contributions on a public ledger.

In response to the multi-media platform 102 determining that the transaction recipient is a playlist owner at decision block 904, the method includes transferring an aggregate amount of money contributions pertaining to the collaborative playlist to the owner of the collaborative playlist in a second transaction at block 912. For example, the multi-media platform 102 illustrated in FIG. 2 may transfer an aggregate amount of money contributions pertaining to the collaborative playlist to the owner of the collaborative playlist in a second transaction.

In response to the multi-media platform 102 determining that the transaction recipient is a content item contributor to the collaborative playlist at decision block 904, the method includes identifying a first content item for playback at block 908. For example, the multi-media platform 102 illustrated in FIG. 2 may receive a first content item for playback from the second user account. According to some examples, the method includes providing a reward to the second user account for including the first content item in the collaborative playlist at block 910. For example, the multi-media platform 102 illustrated in FIG. 2 may provide a reward to the second user account for including the first content item in the collaborative playlist.

Although the operations 906, 912, and 908 are depicted separately in the method 900, examples are considered in which there are multiple transaction recipients for a transaction, such as two or more of an artist, a playlist owner, and/or a content item contributor.

Figure 10:
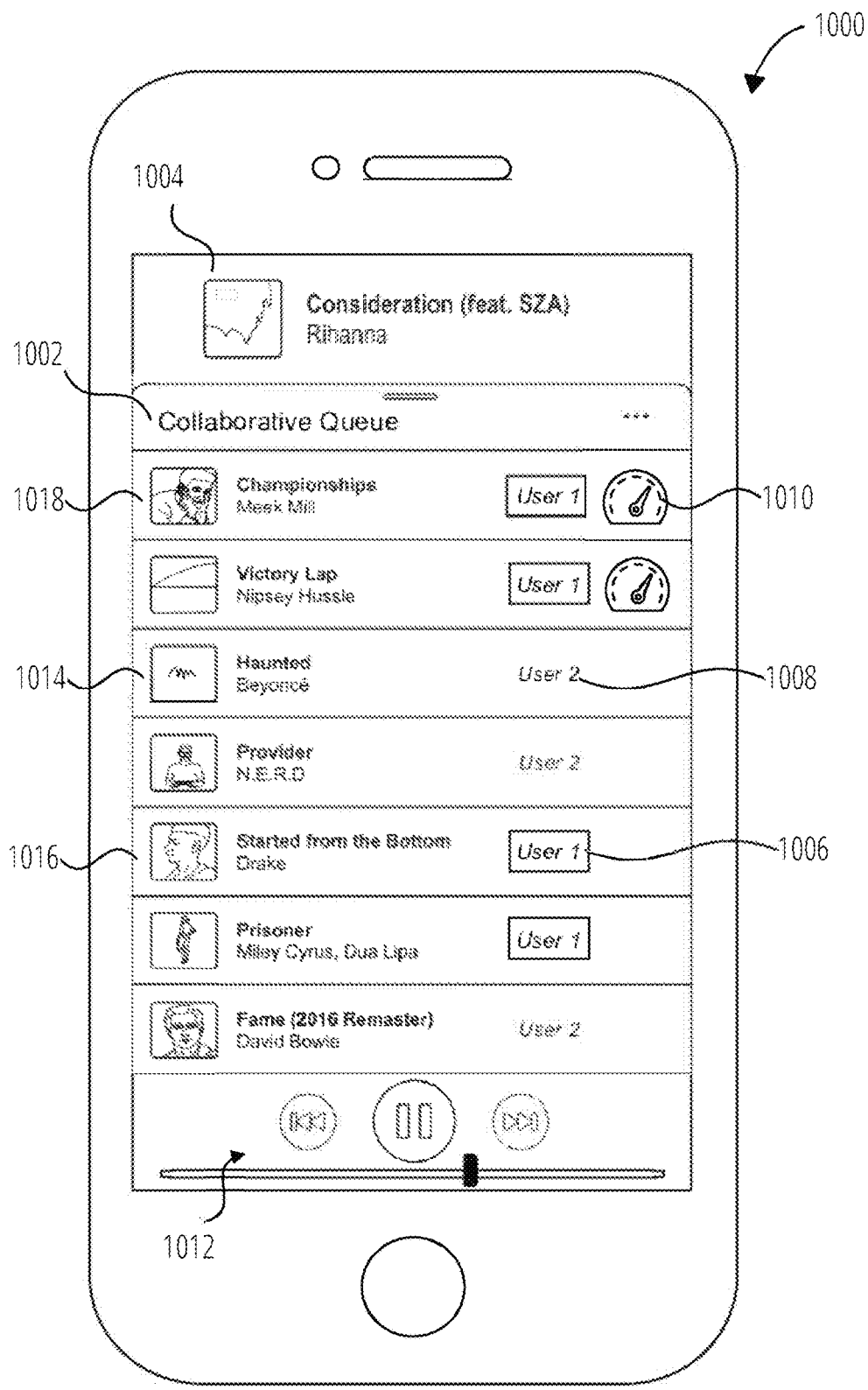
FIG. 10 illustrates an example user device executing an instance of the multi-media application to interact with a collaborative playlist in accordance with some aspects of the present technology.

FIG. 10 illustrates an example user device executing an instance of the multi-media application to interact with a collaborative queue 1000.

As illustrated in FIG. 10, the multi-media application is presenting a graphical user interface showing a collaborative queue 1002 of the collaborative playlist including a collection of content items. At the top of the graphical user interface is a currently playing content item 1004 with playback controls 1012 shown at the bottom of the graphical user interface.

The content items are presented with identifying metadata and an indication of which user account 1008 and 1006 added the content item to the collaborative queue of the collaborative playlist. For example, User 2 1008 added content item 1014 to the collaborative queue, and User 1 1006 added content item 1016 to the collaborative queue.

The graphical user interface of the multi-media application further provides information about whether the indicated user accounts are engaged in an active session with the collaborative playlist. A user is engaged in an active session when the user both has access to the collaborative playlist and the user has recently (e.g., within the last 1 hour, the 30 minutes, last 10 minutes, etc.) with the collaborative playlist. For example, User 1 1006 is distinguished with a box around the indicator indicating that User 1 is engaged in an active session with the collaborative playlist. User 2 1008 is not currently engaged in an active session with the collaborative playlist as indicated by the indicator for that user account without the box. A user is not currently engaged when the user has access to the collaborative playlist but the user are not interacting with the collaborative playlist.

The graphical user interface of the multi-media application further provides information about the voting status for content items in the collaborative queue. For example, a vote gauge 1010 demonstrates that content item 1018 has been upvoted by receiving more votes than other content items in the collaborative queue. It is not necessary that a content item receive a vote to be selected for playback.

In some implementations, the collaborative queue 1002 can be shared with remote users. In another implementation, the collaborative queue 1002 is shared with user devices meeting a predefined threshold condition. For example, the condition can be set based on location, e.g., for users within a geofence, e.g., in a car, or for users with a certain identifier, such as last name, or for users connected on a social graph, determined for example using third party integrations with social networks or messaging applications.

Persons of ordinary skill in the art will appreciate that there are many ways to convey the information described with respect to FIG. 10 and the present technology should not be considered limited to what is drawn in the illustrated example.

Figure 11:
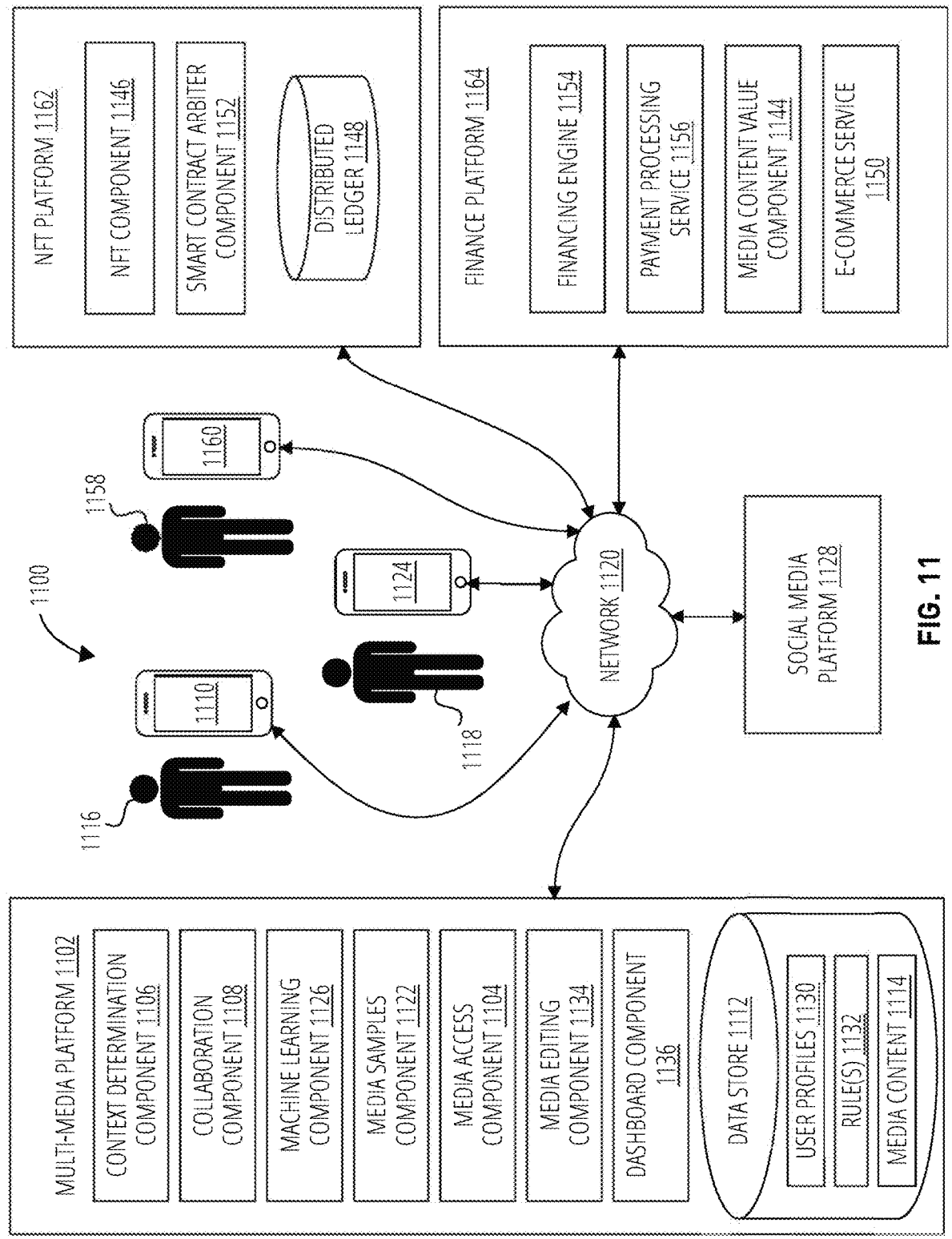
FIG. 11 illustrates an example system of functional components in accordance with some aspects of the present technology.

FIG. 11 illustrates an example environment for performing techniques described herein, according to an example of the present subject matter.

In some examples, the environment 1100 can include a multi-media platform 1102, an NFT platform 1162, a finance platform 1164, and a social media platform 1128 and user devices (first user device 1110, second user device 1124, and artist device 1160). While FIG. 11 illustrates these several platforms, it will be appreciated by those of skill in the art that one or more of these platforms may not be needed to perform some functions supported by the environment illustrated in FIG. 11. Furthermore, while FIG. 11 illustrates a logical arrangement of various components, e.g., components 1116 to 1164, that can perform various respective functions, that the present technology is not limited to the arrangement illustrated. For example, one or more services depicted as being part of the finance platform 1164 could be part of the multi-media platform 1102. It will also be appreciated by those of ordinary skill in the art that one or more other platforms or components can exist.

As used herein, a platform can comprise computing components (e.g., software and a surrounding ecosystem of resources) associated with service(s) provided by the service provider, e.g., multi-media platform 1102. The multi-media platform 1102 is an entity that is a digital service provider (DSP) hosting media content (e.g., songs, videos, vlogs, podcasts, interviews, mixes of songs such as remixes, covers, playlists, etc. shown in 130) or otherwise making available such media content. In addition, the digital service provider may support payments functionality to allow users of the DSP to pay/rent/use the media content and also allow DSP to pay third parties (such as right holders of the media content) for the media content. The multi-media platform 1102 may store and track the use of media content (e.g., in terms of streaming count, revenue collected, artist content, and engagement statistics). In some examples, the multi-media platform 1102 can configure a dashboard using the dashboard component 1136 to display statistics related to engagement with media content and the usage of the media content by users and/or artists. Such a dashboard can be configurable to the artist or user accessing it. In some examples, the artist can target merchandise relevant to the user, e.g., by converting data from the dashboard to a marketplace hosted by the multi-media platform 1102 or a third party in a frictionless manner. The multi-media platform 1102 may allow the artist to receive payments instantly for the use of media content. For example, the artist can be paid directly before making payments to publishers or labels. In one implementation, the multi-media platform 1102 may configure the platform to allow artists to receive tips directly from the user interface of the multi-media application 112, e.g., directly from streams or marketplace sales. In some examples, the multi-media platform 1102 may use data analytics and machine learning to predictively or preemptively determine what type of situations are likely to generate tips and present tipping options accordingly or have analytics-driven tip suggestions (how much to tip, where to place the tipping button, etc.), and even customize sender/recipient tipping profiles (e.g., identifiers or usernames for peer-to-peer ("P2P") platforms, financial service providers such as account information to encourage tipping behavior). In one example, the server can determine who the intended recipient of the tip should be on a payment transaction such that the right artist (out of all the artists associated with the song-vocalists, musicians, etc.) is getting those tips. The recipients can be highlighted using identifiers (e.g., monetary indicator prefixing alphanumeric user name) on social network platforms ("hey send artist $5 for our performance tonight") and/or on the multi-media application based on the context of engagement or usage of media content on the music service.

While the environment 200 also illustrates one example of each of the multi-media platform 1102, the NFT platform 1162, the finance platform 1164, the social media platform 1128 the first user device 1110, the second user device 1124, and the artist device 1160, it will be appreciated that there can be any number of such platforms and devices. In the case of the platforms and services, each of these represents any number of instances of such platforms and services. Likewise, there can be any number of devices in any category of user devices (first user device 1110, second user device 1124, and artist device 1160).

In some examples, the multi-media platform 1102, the NFT platform 1162, the finance platform 1164, and the social media platform 1128 can all be provided by the same service provider or parent entity. In some examples, one or more of the multi-media platform 1102, the NFT platform 1162, the finance platform 1164, and the social media platform 1128 can be provided by one or more third-party entities, and the components within the various platforms can interact to take advantage of services provided by other components shown in FIG. 11 by calling application programming interfaces (APIs) offered by the components.

The multi-media platform 1102 can provide one or more services surrounding the streaming, playback, management, sharing, editing (e.g., mixing and/or remixing media, adding annotations to media), or social engagement around media content, etc. In some examples, the multi-media platform 1102 can include a media access component 1104 that is configured to provide functionality around the accessing, e.g., browsing, broadcasting, streaming, and playback, of media content such as those media content 1114 stored at data store 1112. While the term streaming is used herein, the provision of media content by the multi-media platform 1102 need not conform to any particular data transfer technique or protocol unless otherwise stated. Furthermore, the multi-media platform 1102 includes a streaming user facing service or an artist facing service or a third party (such as a label or publisher) facing service, or a combination thereof.

In some implementations, media content can be requested by first user device 1110 or artist device 1160 in advance and cached prior to playback of the media content. In some examples, the streaming and playback of media content can be a social experience that can be facilitated by collaboration component 1108, which supports social or collaborative media content experiences, such as social playback, live playback streams, or collaborative media editing. In some examples, the collaboration component 1108 allows snippets or previews of the media to be shared with users. In some examples, the collaboration component 1108 can also generate data based on collaboration from users (artists, hosts, audience members, labels, etc.) to adjust the shared experience. The collaboration component 1108 may leverage machine learning for social recommendations, as well as collaborative playlists, large-scale group chat, and behavior-based music programming, and implement algorithms to help discover like artists, listeners, or media and to then inform the shared experience. The collaboration data includes engagement with a current playlist, activities before the current shared experience, and even after (e.g., where did a user of an audience member client device navigate after playing the shared playlist or live playback stream).

The multi-media platform 1102 can also include a media editing component 1134 configured to provide user interfaces and functionality surrounding functions to allow users of the multi-media platform 1102 to edit media content to make their own versions or remixes of media content. In some examples, one way to edit media content is to extract a sample of media content for incorporation into another media content. A media samples component 1122 can be configured to provide the functionality to assist in the creation and management of media content samples. In some examples, media samples component 1122 can be configured to access a library of existing samples. In some examples, media samples component 1122 can be configured to automatically suggest samples from selected media content.

In some examples, users can apply "mix rules" to be applied during a transition between two songs in a playlist. Users can also apply "mix rules" or "filters" to annotate the media (e.g., apply voiceovers, narratives, etc., in real-time or near real-time as the media is being streamed). Mix rules can define or control one or more aspects of the playback of the songs to which the mix rules are applied, including, for example, tempo, pitch, sound effects, volume, and fade-in and fade-out times. Mix rules can also assign specific interactive features to portions of the media such that engagement with the interactive features triggers actions. For example, a mix rule can be assigned to media that allows an artist to be paid or tipped. Mix rules can be predefined by the user, system generated, or even generated in collaboration with one or more users. In some implementations, mix rules can be based on the user's biometrics, mood, voice, or emotional state analysis. Mix rules can also be "crowdsourced." Crowdsourcing mix rules refer to deriving mix rules based on mix information generated by users of the multi-media platform 1102. Mix rules and mix information are the same type of information (e.g., parameters and values of parameters for modifying and/or manipulating playback of content items). As used herein, "mix information" is used to refer to user-generated mix rules (e.g., parameters and values specifying the user-generated mix rules) that are received or accessed by the media streaming service and from which "mix rules" can be crowdsourced.

The context determination component 1106 can determine context data associated with communications occurring in collaborative experiences on multi-media platform 1102 or communications occurring on social media platform 1128 surrounding media content. In some examples, the context determination component 1106 can determine one or more of a date associated with a communication, a time associated with the communication, a topic associated with the communication, content of the communication, a user preference of a user associated with the communication, a customer preference of a customer associated with the communication, a communication channel via which the communication was received, a service/platform via which the communication was received, etc. In some examples, the context determination component 1106 can determine a date based at least in part on a timestamp associated with the communication and/or a time based at least in part on a timestamp associated with the communication.

In some examples, the context determination component 1106 can determine a user preference (e.g., shopping habits or listening behavior) based at least in part on using a user identifier associated with the communication to access a user profile of the user profiles 1130. In some examples, the content context determination component 1106 can determine a user preference based at least in part on determining that a user is similar to other users associated with the service provider (e.g., using a similarity algorithm or the like) of which one or more preferences are known. In some examples, the context determination component 1106 can determine a customer preference based at least in part on using a customer identifier associated with the communication to access a customer profile of the user profiles 1130. In some examples, the context determination component 1106 can determine a customer preference based at least in part on determining that a customer is similar to another one or more customers associated with the service provider (e.g., using a similarity algorithm or the like) of which one or more preferences are known.

In some examples, the context determination component 1106 can determine a topic and/or content of the communication based at least in part on analyzing data associated with a communication (including historical communications and communications received by other similar users and/or creating a priority tree based on the history of such communications) and information related to the parties (e.g., users and/or customers) involved in the communication. Communications can be received in the form of questions (e.g., "when does this album release?"), requests to add/change playlists, questions regarding concert details, etc. In some examples, the context determination component 1106 can utilize natural language processing, image processing, and/or other machine-trained models to determine content of the communication. In some examples, the context determination component 1106 can utilize a classifier or other model to determine semantic meaning of the communication and can determine a topic of the communication based at least in part on such a determination. In some examples, a communication can be translated into a particular language for processing and, any responses can be translated back to the original language associated with the incoming communication.

In some examples, the context determination component 1106 can determine that a communication is associated with a temporal expression. In some examples, the context determination component 1106 can utilize a machine-trained model (e.g., a classifier, etc.) to detect a temporal expression in the contents of a communication. In some examples, rule-based approaches or probabilistic semantic parsing can be used to detect a temporal expression in a communication. In some examples, the context determination component 1106 can partition a communication based on identified temporal expressions and can model the communication with an expression representative of the communication. In some examples, a multi-stage pipeline can be used to label and parse communications. In some examples, labels can be determined by artificial neural networks, such as transformers, using an information extraction head. In some examples, parsing can be performed using a rule-based context free grammar (CFG) parser. In some examples, semantic role labeling and parsing, such as (text) span labeling or dependency labeling, can be used to discover the context in a sentence. In some examples, techniques described herein can identify labelled spans by fine-tuning the artificial neural networks with an information extraction head, and parse spans using a rule-based CFG parser. In some examples, temporal expressions can be associated with labels indicating inclusionary or exclusionary preferences. The context determination component 1106 can utilize heuristic pragmatics to determine which preferences to update or keep. In some examples, a previously presented candidate time can be used as a reference time, and date and time preferences can be updated independently. In some examples, the context determination component 1106 can compose one or more temporal expressions associated with a communication into an aggregated expression, which can be combined with grammar and backed with logical formalism, to compose a long, complex temporal expression, and which can be used for determining a response and/or otherwise negotiating time. Such context determination (e.g., of temporal expressions) can be used to negotiate time, as described herein, which can be useful for scheduling or rescheduling appointments, reservations, and/or the like.

Machine learning techniques as described herein can be applied to additional or alternative implementations beyond the negotiation of time for scheduling or rescheduling events, appointments, reservations, and/or the like. For instance, in some examples, the context determination component 1106 can determine that a communication is associated with a geographical and/or location-based expression (e.g., the communication is location-related). As an additional or alternative example, in some examples, the context determination component 1106 can determine that a communication is associated with a commercial expression (e.g., the communication is transaction-related). As described above with reference to temporal expressions, in some examples, rule-based approaches or probabilistic semantic parsing can be used to detect such expressions in a communication. In some examples, the context determination component 1106 can partition a communication based on identified commercial expressions and model the communication with an expression representative of the communication. As described above, in some examples, a multi-stage pipeline can be used to label and parse communications. In some examples, labels can be determined by artificial neural networks, such as transformers, using an information extraction head. In some examples, parsing can be performed using a rule-based CFG parser. In some examples, semantic role labeling and parsing, such as (text) span labeling or dependency labeling, can be used to discover the context of a sentence. In some examples, techniques described herein can identify labeled spans by fine-tuning the artificial neural networks with an information extraction head and parse spans using a rule-based CFG parser.

The machine learning component 1126 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. Machine-trained models described above can be generated and/or trained by the machine learning component 1126 and stored for use at run time.

In some examples, the machine learning component 1126 can utilize stored communication data associated with communications or other communications received and/or sent by the multi-media platform 1102 as training data for training, using machine learning, a model for determining temporal expressions in communications. Such temporal expressions can be used for determining recommendations with respect to responses to communications. In some examples, the machine learning component 1126 can receive new training data based at least in part on recommendations previously output by the machine-trained models and can modify weights or other aspects of the machine-trained models to improve the accuracy thereof. That is, in some examples, communication data associated with communications received and/or sent by the multi-media platform 1102, recommendations generated based thereon, new product or service integrations, etc. can be associated with new training data that, when analyzed by the machine learning component 1126, cause improvements to features associated with the machine-trained models. As such, techniques described herein enable such machine-trained models to improve over time.

In some examples, the context determination component 1106 can utilize a machine-trained model (e.g., a classifier, a neural network, etc.) to determine which communication channel(s) and/or platform(s) to route communications and apply mix rules. Techniques described herein provide systems and methods for modifying media (e.g., mixing, and/or remixing music) within the context of a multi-media platform 1102.

In some examples, the multi-media platform 1102 includes an artist portal displayed via a dashboard component 1136. The dashboard component 1136 can configure a dashboard to display statistics related to engagement with media content and the usage of the media content by users and/or artists. Such a dashboard can be configurable to an artist user account or other user. In some examples, the artist can target merchandise relevant to the user, e.g., by converting data from the dashboard to an e-commerce service 1150. The multi-media platform 1102 may allow the artist to receive payments instantly for the use of media content through integration with payment processing service 1156. For example, the artist can be paid directly before paying publishers or labels. In some examples, the multi-media platform 1102 may allow artists to receive tips directly from the user interface of a multi-media application operating on user devices, e.g., directly from streams or marketplace sales.

In some examples, the multi-media platform 1102 can generate the consolidated communication user interface and can send instructions for presenting the consolidated communication user interface via the first user device 1110 or artist device 1160. In some examples, the multi-media platform 1102 can aggregate communications and/or other contextual data (e.g., appointments, receipts, feedback received, orders, fulfillment actions, payments, etc.) based at least in part on such communications and/or other contextual data being associated with the same token or identifier. That is, communications and/or other contextual data associated with the same token or identifier can be consolidated into a conversation. Representations of conversations can be presented via the dashboard component 1136.

In some examples, recommendations related to communication channels and/or platforms for routing communications can be surfaced via the consolidated communication user interface. In some examples, the multi-media platform 1102 can utilize such a recommendation to perform an operation without input from the first user 1116 (e.g., automatically). For instance, the multi-media platform 1102 can send a response via the second communication channel and/or second platform without receiving an instruction to do so from the first user 1116.

In some examples, the multi-media platform 1102 can generate personalized analytics for users (e.g., here are the top 10 genres and 30 songs played most this entire year; or here is what users in San Francisco loved as their top 10 songs this year, etc.). The multi-media platform 1102 exposes APIs/SDKs to report out what the San Francisco audience listens to as music during dinner time or give you the real-time report of the top 10 songs your city is listening to right now; or even offer interactive games. The multi-media platform 1102 also supports "skins" or user interface themes for user interface so users can customize how their app looks and other visual features that can be adjusted, audio-adjustment tools (e.g., adjust frequencies, bass, treble, etc.) users can add on to adjust how their music is played, etc.

In some examples, the multi-media platform 1102 can be associated with one or more data store 1112, which can store data including, but not limited to, user profiles 1130, rule(s) 1132, and media content 1114.

The data store 1112 can be configured to store data that is accessible, manageable, and updatable. While, in FIG. 11, the data store 1112 is shown as part of the multi-media platform 1102, this may just be a logical association. The data store 1112 can be located in any data center and can be accessible to the multi-media platform 1102. The data store 1112 can comprise multiple databases and/or servers connected via the network 1120.

The network 1120 can be one or more networks including a local area network, or wide area network, and can be a public network or a private network. The network 1120 can utilize any type of communication technology including wired or wireless communications, tunnels, virtual private networks ("VPNs"), etc. The network may be an ad hoc network that is instantiated between two or more devices as needed or can be an infrastructure network that is persistently available to devices. The network 1120 can connect any of the devices and platforms illustrated in FIG. 11. For example, the network 1120 can connect first user device 1110, second user device 1124, and artist device 1160 together in a peer-to-peer network or can connect these devices through a service or platform such as multi-media platform 1102 or social media platform 1128.

The network 1120 can also connect various components within a platform, such as multi-media platform 1102 with other services provided by the platform. For example, the media access component 1104 can be connected to data store 1112 via network 1120, and the media samples component 1122 can be connected to media content value component 1144 via network 1120, etc.

In some examples, the data store 1112 can store user profiles 1130. The user profiles can store information pertaining to user accounts of the multi-media platform 1102. In some examples, some user accounts can pertain to artists whose media content are accessible through the multi-media platform 1102. In some examples, artist user accounts can be associated with additional privileges as compared to general user accounts. In such instances, the artist user accounts can be verified that the artist account is associated with one or more media content accessible through the multi-media platform 1102.

The user profiles 1130 can store preference information and conclusions drawn by context determination component 1106 as addressed above.

The user profiles 1130 can also store permissions associated with the user account. The permissions can indicate which users are permitted to send and/or receive communications. In some examples, such permissions can be particular to an individual user, a user, a title or role associated with a user (e.g., digital rights associated with a title of artist, label, publisher, or the like). In some examples, permissions can be particular to device codes (e.g., codes provisioned to users to grant temporary access to a functionality). The permissions can provide security and/or access control to individual communications. That is, in some examples, the permissions can enable the multi-media platform 1102 to selectively present communications to certain users while restricting access of other users to certain communications. In some examples, the multi-media platform 1102 can utilize the permissions to restrict how users are able to interact and/or respond to communications, and/or access media. In some examples, permissions can be set via a settings user interface.

User profiles can store, or otherwise be associated with, data associated with users through their user accounts (host user account, artist account, audience member user account). For instance, a user profile can store, or otherwise be associated with, information about a user (e.g., name of the user, geographic location of the user, operating hours of the user, streaming statistics, user preferences (e.g., learned or user-specified), identifier(s) of the user (which can be associated with different communication channels and/or platforms), etc.), a user category classification (subscriber level, artist level, etc., hardware (e.g., device type) used by the user, transaction data associated with the user (e.g., transactions conducted by the user, payment data associated with the transactions, items associated with the transactions, descriptions of items associated with the transactions, itemized and/or total spends of each of the transactions, parties to the transactions, dates, times, and/or locations associated with the transactions, etc.), loan information associated with the user (e.g., previous loans made to the user, previous defaults on said loans, etc.), risk information associated with the user (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, messaging data, etc. A user profile can securely store bank account information as provided by the user. In some examples, a user profile can include user preferences with respect to which communication channel(s) and/or platform(s) the user account prefers to use for communication, which identifier(s) associated with communication channel(s) the user profile prefers to use for communication, etc. In some examples, historical communication data associated with a user (e.g., communications sent, communications received, responses, response time, etc.) can be associated with a user profile.

User profiles 1130 can store user data including, but not limited to, user information (e.g., name, phone number, address, banking information, identifier(s) (e.g., associated with different communication channels and/or platforms), etc.), user preferences (e.g., learned or customer-specified), purchase history data (e.g., identifying one or more items purchased (and respective content information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, messaging data, etc. In some examples, a user profile can include user preferences with respect to which communication channel(s) and/or platform(s) the user profile prefers to use for communication, which identifier(s) associated with communication channel(s) the user profile prefers to use for communication, etc. In some examples, historical communication data associated with a user (e.g., communications sent, communications received, responses, response time, etc.) can be associated with a user profile.

The platforms multi-media platform 1102, social media platform 1128, NFT platform 1162, and finance platform 1164 in the environment illustrated in FIG. 11 exist to provide one or more services to users of these platforms. Most often the users of the platforms will have a user account with one or more of these services. The users illustrated in FIG. 11 will be addressed in the context of multi-media platform 1102 wherein most often the users will have a user account with multi-media platform 1102. However, it should be appreciated that the multi-media platform 1102 can support some examples wherein a user may not have an account with the multi-media platform 1102.

As illustrated in FIG. 11, users can have one or several roles in the context of the multi-media platform 1102. Users take a role of a second user 1118, a first user 1116, and/or an artist 1158. None of the user roles (e.g., first user 1116, second user 1118, or artist 1158) are mutually exclusive. Any user of the multi-media platform 1102 can take on one or more of these user roles according to the context in which the user is engaging with the multi-media platform 1102. In this way the role is dynamic and in one implementation, can even change within the context of a single communication between a host and audience member.

FIG. 11 also shows the users being associated with respective user devices. The first user 1116 is associated with a first user device 1110, the artist 1158 is associated with an artist device 1160, and the second user 1118 is associated with a second user device 1124. While different devices (e.g., first user device 1110, artist device 1160, and second user device 1124) are separately illustrated, the devices are not necessarily distinct. The devices can all run the same version of a multi-media application that is associated with the multi-media platform 1102 (or any other application provided by any of the other platforms), and all include the same functionality when their respective user controls the devices to engage in such functionality. Accordingly, a device that is a first user device 1110 in one context can be an artist device 1160 or second user device 1124 in another context.

The multi-media application can be used to send and/or receive communications. Such communications can include text communications, email communications, social media communications, first-party application communications (e.g., communications exchanged via an application associated with the multi-media platform 1102), third party application communications (e.g., communications exchanged via an application associated with a party other than the multi-media platform 1102 and accessible through one or more dedicated API connection points), payments, requests to change playlists or performance, etc.

The first user device 1110, second user device 1124, and the artist devices 1160 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc.

Most often users will interact with the multi-media platform 1102 in the context of a second user 1118. A second user 1118 is a user that is consuming services of multi-media platform 1102 to receive media content for playback or their own editing of media content.

In some examples, a user account can host a collaborative media experience or a public playback experience. In a collaborative media experience, a host can engage with one or more other specific user accounts through collaboration component 1108 to jointly control playback or editing of media content. In a public playback experience or more user accounts acting as a first user 1116 can host a playback experience that user accounts acting as audience members can join to experience the playback led by the first user 1116.

First users 1116 can leverage machine learning for social recommendations, as well as collaborative playlists, large-scale group chat, and behavior-based music programming, and implement algorithms to help find people who are listening to the same media as first user 1116. In some implementations, the media may have digital rights that restrict the playback of media on third-party platforms where the playlist was shared. In some examples, the collaboration component 1108 allows digital rights to be conditionally/provisionally shared with other users, even if the users are not subscribers of multi-media platform 1102. In another example, collaboration component 1108 allows digital rights or identity verification can be obtained via friction-less onboarding of the users onto the multi-media platform 1102, for example, via third-party platform credentials, or phone number, linked payment information and the like.

The collaboration component 1108 allows the users to experience the same playback of a media content as that of the first user 1116 through live playback streams. In some cases, the multi-media platform 1102 may attribute playbacks of a media content included in a live playback stream hosted by first user 1116 as being attributed to the user account of first user 1116 to maintain an accurate accounting of playbacks of the media content. For example, if 10 audience members are listening to a media content instance included in the live playback stream hosted by first user 1116, the media service may count 11 playbacks of the media content and attribute it to originating from first user 1116.

In the context of sharing, the collaboration component 1108 allows streaming users, such first user 1116, artist 1158, to share the media content the users are currently experiencing (listening to or watching) with other users (e.g., second user 1118). Users who are connected to the channel or following first user 1116 or users with whom first user 1116 shares the playlist (e.g., on the same media content supported by multi-media platform 1102) can experience the playlist in a manner same as or similar to the first user 1116. For example, the second user 1118 can listen to the same song the first user 1116 is listening to and synced at the exact moment of song/cadence or structure of the song, or follow along as the first user 1116 skips or interacts with the song. In this manner, the media content is effectively synced with all instances where the media content is playing, or alternatively the media content is synched with respect to one user such that any other second user 1118 joining in the playlist is synced to the moment user first user 1116 is experiencing. This kind of collaborative streaming may leverage machine learning for social recommendations, as well as collaborative playlists, large-scale group chat, and behavior-based music programming, and implement algorithms to help you find people who are listening to the same media that the user first user 1116 is. In some implementations, the media may have digital rights that restrict the playback of media on third-party platforms where the playlist was shared. In one example, the collaboration component 119 allows digital rights to be conditionally/provisionally shared with other users, even if the users are not subscribers of multi-media platform 1102. In another example, collaboration component 1108 allows digital rights or identity verification can be obtained via friction-less onboarding of the users onto the multi-media platform 1102, for example, via third-party platform credentials, or phone number, linked payment information and the like. In one example, the collaboration component 1108 allows snippets or previews of the media to be shared with second user 1118. In yet another example, the collaboration component 1108 allows the second user 1118 to be synced to the same instance of the song that the first user 1116 is listening to, thus allowing digital rights to be managed once, i.e., with respect to the usage of first user 1116. In some cases, the media service may attribute second user 1118 of first user 1116 listening to the song and streaming count as first user 1116's thus if 10 connected users are listening to the song instance of first user 1116, the media service may count it as 11 counts of streaming and attribute it to originating from the first user device 1110.

The collaboration data includes engagement with the current playlist, activities before the current shared experience and even after (e.g., where did the users go after playing the playlist). For example, based on real-time or near-real time engagement to the experience, second user 1118 or if the sharing user is first user 1116, modify the playlist. The data can also reflect segmentation of data, demographics, location, etc., to better customize the playlist. Such data can also be used to train machine learning models, to allow users, such as artists, to get tipped and paid in real time, get feedback in real time or near real time on media or portions of media or playlists, generate customized fan experiences based on the collaboration data. In some aspects the feedback can be multi-way to allow the customer second user 1118 to send a communication to a first user 1116 or artist 1158 via computing devices and receive a response. In at least one example, the second user device 1124 can send a communication to the first user device 1110 or the artist device 1160 via the multi-media platform 1102 or social media platform 1128. In some examples, the second user device 1124 can send a communication to the first user device 1110 or the artist device 1160 directly. In at least one example, the communication can be associated with a user identifier identifying the user and a customer identifier identifying the customer. In some examples, the customer identifier can be a device identifier or the like. In some examples, the customer identifier can be particular to the type of communication channel through which the communication is transmitted (e.g., a customer identifier can be a phone number if the communication channel is a text communication, an email address if the communication channel is an email, etc.). In at least one example, the communication can be sent via a first communication channel, which can comprise a text communication, an email communication, a communication sent via a first-party application, a communication sent via a third-party application, a social media communication, and/or the like. "Communications," as used herein, can refer to any object, which can be associated with textual elements, graphical elements, image elements, video elements, sound elements, and/or the like, that can be transmitted via a communication channel. In some examples, communications can be associated with attachments, coupons, and/or embedded functionality (e.g., deeplinks, hyperlinks, payment links, etc.). While not described in detail, in at least one example, the second user device 1124 or first user device 1110 can initiate a conversation via a phone call. In some examples, the second user device 1124 or the first user device 1110 can initiate the conversation via a first platform associated with a first service, such as a feedback service, a payment service, a fan experience service (offer a limited edition merchandise, provide a preview to an unreleased song/or the like) etc., as described above.

In some examples, a first user 1116 can operate a computing device, such as a first user device 1110, to utilize services offered by the multi-media platform 1102. While a single first user 1116 is illustrated, any number of users can be present in the environment.

In some examples, one or more artists 1158 (also referred to as artist account), such as an artist 1158, can operate respective computing devices, such as an artist device 1160. Artist accounts can be endowed with additional privileges beyond that of a second user 1118 or first user 1116. For example, an artist account may have privileges to interact with second user 1118 that are fans of an artist account, and may also be able to access statistics related to the accessing of media content for which their user artist account is an attributed artist.

Artist accounts can also receive data to help build their brand or to make additional revenue. Data gathered by context determination component 1106, context determination component 1106, and machine learning component 1126 can be used to train machine learning models, to allow users, such as artists, to get tipped and paid in real-time, get feedback in real-time or near real-time on media or portions of media or playlists, generate customized fan experiences based on the collaboration data. In some aspects, the feedback can be multi-way to allow the artist 1158 to send a communication to a second user 1118 and receive a response. In some examples, these communications can be supported by the multi-media platform 1102 or the social media platform 1128.

In addition, the multi-media platform 1102 may support payment functionality to pay artist accounts to allow users of the multi-media platform 1102 to pay/rent/use the media content and allow multi-media platform 1102. The multi-media platform 1102 may store and track the use of media content (e.g., in terms of streaming count, revenue collected, artist content, engagement statistics).

In some examples, the multi-media platform 1102 may use data analytics and machine learning to predictively or preemptively determine what type of situations are likely to generate tips and present tipping options accordingly or have analytics-driven tip suggestions (how much to tip, where to place the tipping button, etc.), and even customize sender/recipient tipping profiles (e.g., $cashtags or usernames for peer to peer payment platforms, financial service providers such as account information to encourage tipping behavior). In some examples, the multi-media platform 1102 can determine who the intended recipient of the tip should be on a payment transaction such that the right artist (out of all the artists associated with the song—vocalists, musicians, collaborators of the playlist, owners of the playlist, etc.) are getting those tips. The recipients can be highlighted using $cashtags on social network platforms ("hey send artist $5 for our performance tonight") and/or on the multi-media application based on the context of engagement or usage of media content on the music service.

FIG. 11 also illustrates platforms that can provide services that are ancillary to the services of the multi-media platform 1102. While these platforms are illustrated as separate from the 1102, these platforms can be part of the multi-media platform 1102, or one or more of the components of these platforms can be included in the multi-media platform 1102.

In some examples, the system illustrated FIG. 11 is under the management of a common service provider as that of the multi-media platform 1102. In some examples, the components of the system illustrated in FIG. 11 can be under the management of several different third-party service providers. Each of the components may be accessible to each other through one or more APIs. Regardless of whether the components illustrated in FIG. 11 are under the management of a common party or third parties, each of the components illustrated in FIG. 11 may communicate with any other component illustrated in FIG. 11 to provide one or more of the functions addressed herein.

The finance platform 1164 can provide one or more financial-related services. For example, the finance platform 1164 includes a financing engine 1154 configured to provide financing such as loans or advances to artist accounts so that the artist accounts may use the financing to create additional media content and or produce experiences or merchandise for purchase by other users of the multi-media platform 1102. In some examples, the financing engine 1154 is configured to work with other services illustrated in FIG. 11 to generate financing terms. In some examples, the financing terms are based on expected revenues from sales of media content, performances of media content, sales of merchandise in e-commerce service 1150, licensing of media content through sales of non-fungible tokens (NFT), etc. In some examples, the financing engine 1154 is also configured to work with a payment processing service to extract a portion of payments received by an artist account, thereby allowing the artist account having financing from financing engines to repay the financing.

In some examples, artist accounts may be associated with an E-commerce web page offered by e-commerce service 1150 that can offer merchandise and experiences for sales to other user accounts of multi-media platform 1102. The payment processing service 1156 can provide payment processing for carrying out transactions by the e-commerce service 1150 and multi-media platform 1102.

The payment processing service 1156 can also be configured to pay royalties to artist accounts wherein the royalties are associated with the playback of media content associated with the artist account.

The environment illustrated in FIG. 11 also includes the NFT platform 1162 for supporting services associated with offering media content and merchandise as a non-fungible token (NFT). In some examples, the artist accounts may elect to embody the value of one or more of their media content in a non-fungible token. "Non-fungibility" refers to the uniqueness or non-interchangeability of individual units of an asset. For example, NFTs cannot be replaced with other tokens of the same type. An example format for an NFT on the Ethereum blockchain is a token standard referred to as ERC-721. The ERC-1155 standard offers semi-fungibility. Unlike ERC-721, where the unique identifier represents one asset, the unique identifier of the ERC-1155 token represents a whole class of fungible assets, any number of which the user can transfer to others. Components based on the ERC-998 standard are the templates according to which NFTs can be either non-fungible or fungible assets.

While Ethereum is a popular choice for NFT marketplaces, there are non-Ethereum NFT marketplaces as well, belonging to other blockchain networks like Cosmos, Polkadot, International Blockchain Consulting (IBC), Interledger, Binance Smart Chain, etc. Each of the NFT marketplaces operates slightly differently and has specific instructions, standards, formats, and/or the like. For example, some of the NFTs are curated while others are self-service based. Creating NFTs on some platforms have substantial transaction fees to mint, while some marketplaces do not support specific file formats or sizes of assets. Some platforms are user-friendly, while others have a complex user interface that takes significant training.

The NFT component 1146 can be configured to generate (or mint) an NFT for one or more media content in near real time, according to user's preferences (e.g., specific blockchain, expiration time, user's preferences, user's location (e.g., if it is detected that a user is operating in a wallet on a different blockchain) and the context of the conversation (or live media content) between the host and the audience member. The NFT component 1146 can be configured to capture a unique description of the media content and/or to provide a persistent link or reference to the media content associated with the NFT. The NFT component 1146 can also be used to create a smart contract used to govern the behavior of the NFT. For example, a smart contract can govern instances when the NFT can be transferred to another party or when a media content can be divided into a smaller portion such as a sample, or when and how the media content can be performed.

When the NFT includes a smart contract chaincode, (e.g., such as system chaincode available in Hyperledger Fabric 1.0), the governing of the smart contract can be provided by the smart contract arbiter component 1152. The smart contract arbiter component 1152 can be used to determine that one or more conditions referenced in a smart contract have been satisfied. The smart contract arbiter component 1152 can otherwise be configured to interpret and execute the code defining a smart contract. Through a plurality of smart contracts or chain code, the distributed ledger 1148 can maintain a consensus between different blockchains with relation to user's wallets and underlying NFTs, route an incoming transaction to one of the blockchain(s), e.g., based on context data, and then enable processing of the transaction on the blockchain.

The distributed ledger 1148 is configured to store NFTs. In some examples, the distributed ledger 1148 can be a blockchain network, particularly a blockchain network that supports smart contracts. One such blockchain network is the ETHEREUM network.

In some examples, the present technology includes creating and maintaining a datastore for the media content (and related digital rights such as mechanical rights, publisher rights, master rights, synchronization rights, etc., held by one or more parties such as labels, publishers, artists, etc., parties who have invested in the media content) and/or a record of interactions with the media content. In some examples, such rights are stored in distributed ledger 1148 and can be associated with an NFT and smart contract.

In some examples, media content are amenable to being divided into smaller components called samples. For example, a sample of a music content may include a portion of the music track, e.g., a short segment of the music track or a particular sound extracted from the music track. The media samples component 1122 can be configured to determine potential portions of a media content that may have a distinct value. In some examples, the media samples component 1122 utilizes machine learning algorithms trained to identify potential samples from a media content. For example, in one implementation, the media samples component 1122 integrates with third party application to measure engagement of the media content (and specific portion of the media content) to then determine value.

In some examples, e-commerce service 1150 can function as a marketplace for transferring one or more NFTs embodying a value of a media content. In some examples, the media content value component 1144 can be used to determine a current value or a spot price for a media content or a sample of a media content. In some examples, the media content value component 1144 utilizes data retrieved from an e-commerce service 1150, multi-media platform 1102, social media platform 1128, and other sources. In some examples, the media content value component 1144 can also predict a future value of a media content.

The system illustrated in FIG. 11 also includes a social media platform 1128. The social media platform 1128 is configured to facilitate artist accounts for engaging with fans. In some examples, the social media platform 1128 is configured to integrate with a variety of existing social networks such as FACEBOOK, TWITTER, INSTAGRAM, VRCHAT, TIKTOK, etc. In some examples, the social media platform 1128 is also configured to collect data regarding engagement with media content of an artist on one or more social networks.

While not illustrated in FIG. 11, one or more of the multi-media platform 1102, the NFT platform 1162, the finance platform 1164, and the social media platform 1128 can also include a gift card service (e.g., for ordering and/or selling gift cards or other stored value cards), a loyalty service (e.g., for managing loyalty rewards and/or redemptions), an invoice service (e.g., for managing invoices for services rendered and/or goods purchased), an estimate service (e.g., for managing estimates for services to be rendered and/or goods to be purchased), a contracts service (e.g., for managing contracts between the user and other entities), a reservation service (e.g., for managing reservations), a chat service (e.g., for facilitating communications between the user and other entities), a feedback service (e.g., to receive feedback about various aspects of a business), a directory service (e.g., for maintaining contact information of contacts of the user), an appointment service (e.g., for managing appointments), a payroll service (e.g., for making payroll payments to workers of the user), etc.

In some examples, individual of the services can be associated with their own platforms and, in some examples, can utilize SDKs to communicate with centralized communication components described herein.

In some examples, the multi-media platform 1102 or social media platform 1128 can receive a communication. The multi-media platform 1102 or social media platform 1128 can determine where to route the communication (e.g., send the communication) based at least in part on the user identifier associated with the communication. In some examples, the multi-media platform 1102 of social media platform 1128 can associate a token, or other identifier, with the communication. The token, or other identifier, can be associated with the sending entity (e.g., the artist 1158 and/or artist device 1160). Messages associated with the same token, or other identifier, can be consolidated into a conversation (or "transcript") representative of all communications between the second user 1118 and the artist 1158. In some examples, a conversation can be threaded such that communications associated with a same customer and/or same event/interaction can be grouped together. In some examples, a conversation, as described herein, can be represented in a consolidated communication user interface. In some examples, the media access component 1104 can convert the communication into a "standardized format." The converted communication can be stored (e.g., in the data store 1112) and, in some examples, can be presented via a consolidated communication user interface. In at least one example, the first user 1116, the artist 1158, or the second user 1118 can access the consolidated communication user interface via an application, web browser, or the like. The media access component 1104 can consolidate communications received by the first user 1116, the artist 1158, or the second user 1118 via different communication channels and/or platforms catered for different media content into a single access point (e.g., the consolidated communication user interface) such that the first user 1116, the artist 1158, or the second user 1118 can view and/or respond to communications via interaction with the single access point. In some examples, communications can be arranged by entity (e.g., customer, vendor, etc.), which can be based at least in part on tokens, or other identifiers, as described above. In some examples, communications can be arranged based on date, time, communication channel, content, rules, and/or the like. In some examples, communications can be arranged based on priority, characteristic(s) of the sender (e.g., customer), etc.

In some examples, the multi-media platform 1102 can utilize context data to generate a response or a recommendation for the response or even provide an array of responses to choose from. That is, in some examples, the multi-media platform 1102 can utilize context data to generate personalized loyalty or rewards, that may or may not be surfaced on a peer-to-peer service associated with multi-media platform 1102. For example, the multi-media platform 1102 can recommend actions to incentivize a user or other users to engage more with the media/content based on a second user 1118 attending a virtual or in-person live experience(s), their taste in music, shopping, and behavioral habits, and such context data. In some examples, based on data pertaining to digital experiences, the in-person experience can be configured to engage more with "loyal" users. An artist can provide personalized experiences for "true" fans (e.g., shout outs) or on a digital platform, surface true fans on an online list. "Fandom" can be determined based on the engagement with media, how many times the user has engaged with the content, previous live streams, offline streams, downloads, record catalog that shows the details, NFT purchases, how many times the user has tipped, how many times the user has shared the content, the merchandise that the user has purchased, etc. Such data can be obtained via multi-media platform 1102 and/or social media platform 1128.

In some examples, the multi-media platform 1102 can be used to see who leaves, who engages with data, and who the loyal users are that are more likely to invest in the content. Such data of loyal users can be surfaced to the artists targeted with customized offers. As some examples, the loyal users can be targeted with custom rewards, e.g., specific coupons to use on artist merchandise, or an offer to have direct follower/fan interaction using live chats, post-promotion videos, etc., or other social networking capabilities through the marketplace or otherwise. In some cases a loyal user may be offered augmented reality objects to scan, e.g., in concert venues, to get fan interaction offers such as limited edition merchandise, merchandise access, reserve specific seats, move to the front of the line, meet the artists, passing sync control to the users, etc. A heat map can be generated to show loyal users, new users, and others to adjust the playlists.

In some examples, machine-learning techniques can be used to analyze the media being played at any given moment, gauge the reaction (e.g., explicit or implicit) of the audience and modify the playlist or audio based on real-time or near real time audience feedback.

In some examples, the multi-media platform 1102 can be an open-source toolkit that operates as an software development kit ("SDK") to allow developers to build apps or tools that frame over the media service to support music mixing and sharing of live music experiences (e.g., NFL player sharing live what music the NFL player is listening to in the locker room to pump up for an upcoming game or country artist sharing live what the country artist listens to as calm-down meditative music while the country artist is doing yoga). The multi-media platform 1102 can offer a first set of built-in filters that a user can apply to music the users are listening to create a jazzed, club-vibe, meditative, or cover-song version of the music leveraging artificial intelligence and predictive learning to analyze the notes, tones, frequencies in the music and apply the type of DJ features real-life DJs would have applied to songs with similar notes and frequencies. In some examples, multi-media platform 1102 can present filters for the type of DJing (seaside waves, yoga, club, work concentration) and see how DJs have mixed songs like these with others based on machine learning ("ML") and by analyzing the underlying DSP parameters and comparing to others in that set. In another example, multi-media platform 1102 picks the "filter" first and then recommends songs that can be mixed. So if the user is playing an Adele song, and there are 10 inbuilt filters. Each filter is based on artificial intelligence ("AI") study of thousands of songs. The filter would compare this song and from the notes, tones, frequency, and other DSP parameters determine similar songs or parts of the song and how DJing was applied by a jazz DJ (separate ML training); a pop concert DJ (separate ML model); a rave DJ (separate ML training data set) and apply it accordingly to various segments of the song to get the Auto DJ effect, thus creating a filter bank for songs and music.

Figure 12:
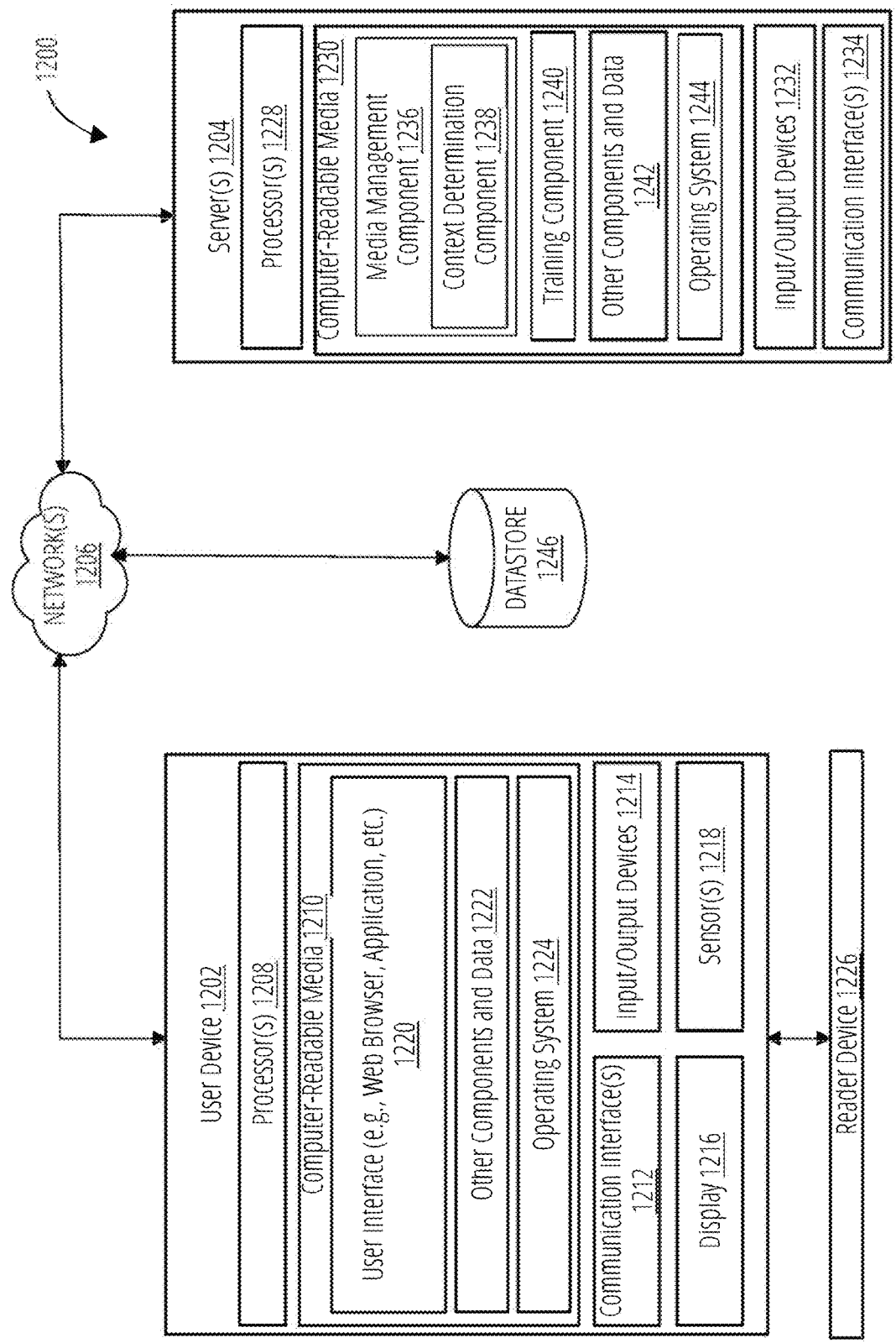
FIG. 12 depicts an illustrative block diagram illustrating a system for performing techniques described herein in accordance with some aspects of the present technology.

FIG. 12 depicts an illustrative block diagram illustrating a system 1200 for performing techniques described herein. The system 1200 includes a user device 1202, that communicates with server computing device(s) (e.g., server(s) 1204) via network(s) 1206 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1202 is illustrated, in additional or alternate examples, the system 1500 can have multiple user devices. In some examples, the user device 1202 can correspond to the first user device 1110 and/or the second user devices 1124 of FIG. 11, and the network(s) 1206 can correspond to the network 1120 of FIG. 11.

In some examples, the user device 1202 can be any suitable type of computing device, e.g., portable, semi-portable, semi-stationary, or stationary. Some examples of the user device 1202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1202 can be any computing device capable of sending communications and performing the functions according to the techniques described herein. The user device 1202 can include devices, e.g., payment card readers, or components capable of accepting payments, as described below.

In the illustrated example, the user device 1202 includes one or more processors 1208, one or more computer-readable media 1210, one or more communication interface(s) 1212, one or more input/output (I/O) devices 1214, a display 1216, and sensor(s) 1218.

In some examples, each processor 1208 can comprise one or more processors or processing cores. For example, the processor(s) 1208 can be implemented as one or more microprocessors, microcomputers, microcontrollers, digital signal processors, central processing units, state machines, logic circuitries, and/or any devices that manipulate signals based on operational instructions. In some examples, the processor(s) 1208 can be one or more hardware processors and/or logic circuits of any suitable type specifically programmed or configured to execute the algorithms and processes described herein. The processor(s) 1208 can be configured to fetch and execute computer-readable processor-executable instructions stored in the computer-readable media 1210.

Depending on the configuration of the user device 1202, the computer-readable media 1210 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1210 can include, but is not limited to, RAM, ROM, EEPROM, flash memory, solid-state storage, magnetic disk storage, optical storage, and/or other computer-readable media technology. Further, in some examples, the user device 1202 can access external storage, such as RAID storage systems, storage arrays, network attached storage, storage area networks, cloud storage, or any other medium that can be used to store information and that can be accessed by the processor(s) 1208 directly or through another computing device or network. Accordingly, the computer-readable media 1210 can be computer storage media able to store instructions, components or components that can be executed by the processor(s) 1208. Further, when mentioned, non-transitory computer-readable media exclude media such as energy, carrier signals, electromagnetic waves, and signals per se.

The computer-readable media 1210 can be used to store and maintain any number of functional components that are executable by the processor(s) 1208. In some implementations, these functional components comprise instructions or programs that are executable by the processor(s) 1208 and that, when executed, implement operational logic for performing the actions and services attributed above to the user device 1202. Functional components stored in the computer-readable media 1210 can include a user interface 1220 to enable users to interact with the user device 1202, and thus the server(s) 1204 and/or other networked devices. In some examples, the user interface 1220 can be presented via a web browser, or the like. In other examples, the user interface 1220 can be presented via an application, such as a mobile application or desktop application, which can be provided by multi-media platform 1102 associated with the server(s) s 1204, or which can be an otherwise dedicated application.

In some examples, the user interface 1220 can correspond to the user interface, In some examples, the user interface 1202 can present a consolidated user interface, or portion thereof. In some examples, a user can interact with the user interface via touch input, spoken input, gesture, or any other type of input. The word "input" is also used to describe "contextual" input that may not be directly provided by the user via the user interface 1220. For example, user's interactions with the user interface 1220 are analyzed using, e.g., natural language processing techniques, to determine context or intent of the user, which may be treated in a manner similar to "direct" user input.

Depending on the type of the user device 1202, the computer-readable media 1210 can also optionally include other functional components and data, such as other components and data 1222, which can include programs, drivers, etc., and the data used or generated by the functional components. In addition, the computer-readable media 1210 can also store data, data structures and the like, that are used by the functional components. Further, the user device 1202 can include many other logical, programmatic and physical components, of which those described are merely examples that are related to the discussion herein.

In some examples, the computer-readable media 1210 can include additional functional components, such as an operating system 1224 for controlling and managing various functions of the user device 1202 and for enabling basic user interactions.

The communication interface(s) 1212 can include one or more interfaces and hardware components for enabling communication with various other devices, such as over the network(s) 1206 or directly. For example, communication interface(s) 1212 can enable communication through one or more network(s) 1206, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Examples of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1202 can further include one or more input/output (I/O) devices 1214. The I/O devices 1214 can include speakers, a microphone, a camera, and various user controls (e.g., buttons, a joystick, a keyboard, a keypad, etc.), a haptic output device, and so forth. The I/O devices 1214 can also include attachments that leverage the accessories (audio-jack, USB-C, Bluetooth, etc.) to connect with the user device 1202.

In some examples, user device 1202 can include a display 1216. Depending on the type of computing device(s) used as the user device 1202, the display 1216 can employ any suitable display technology. For example, the display 1216 can be a liquid crystal display, a plasma display, a light emitting diode display, an OLED (organic light-emitting diode) display, an electronic paper display, or any other suitable type of display able to present digital content thereon. In some examples, the display 1216 can be an augmented reality display, a virtually reality display, or any other display able to present and/or project digital content. In some examples, the display 1216 can have a touch sensor associated with the display 1216 to provide a touchscreen display configured to receive touch inputs for enabling interaction with a graphic interface presented on the display 1216. Accordingly, implementations herein are not limited to any particular display technology. Alternatively, in some examples, the user device 1202 may not include the display 1216, and information can be presented by other means, such as aurally, haptically, etc.

In addition, the user device 1202 can include sensor(s) 1218. The sensor(s) 1218 can include a GPS device able to indicate location information. Further, the sensor(s) 1218 can include, but are not limited to, an accelerometer, gyroscope, compass, proximity sensor, camera, microphone, and/or a switch.

In some example, the GPS device can be used to identify a location of a user. In some examples, the location of the user can be used by the multi-media platform 1102, described above, to provide one or more services. That is, in some examples, the multi-media platform 1102 can implement geofencing to provide particular services to users. As an example, with a lending service, location can be used to confirm that a stated purpose of a loan corresponds to evidence of use (e.g., Is the user using the loan consistent with what user was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with user(s) located proximate to the users. In some examples, location can be used for taking payments from nearby customers when the customers leave a geofence, or location can be used to initiate an action responsive to users enter a brick-and-mortar store of a user. Location can be used in additional or alternative ways as well.

Additionally, the user device 1202 can include various other components that are not shown, examples of which include removable storage, a power source, such as a battery and power control unit, a barcode scanner, a printer, a cash drawer, and so forth.

In addition, in some examples, the user device 1202 can include, be connectable to, or otherwise be coupled to a reader device 1226, for reading payment instruments and/or identifiers associated with payment objects. In some examples, as described above, the reader device 1226 can plug in to a port in the user device 1202, such as a microphone port, a headphone port, an audio-jack, a data port, or other suitable port. In additional or alternative examples, the reader device 1226 can be coupled to the user device 1202 via another wired or wireless connection, such as via a Bluetooth®, BLE, and so on. The reader device 1226 can include a read head for reading a magnetic strip of a payment card, and further can include encryption technology for encrypting the information read from the magnetic strip. Additionally or alternatively, the reader device 1226 can be an EMV payment reader, which in some examples, can be embedded in the user device 1202. Moreover, numerous other types of readers can be employed with the user device 1202 herein, depending on the type and configuration of the user device 1202.

The reader device 1226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1226 may include hardware implementation, such as slots, magnetic tracks, and rails with one or more sensors or electrical contacts to facilitate detection and acceptance of a payment instrument. That is, the reader device 1226 may include hardware implementations to enable the reader device 1226 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1226 may also include a biometric sensor to receive and process biometric characteristics and process the biometric characteristics as payment instruments, given that such biometric characteristics are registered with the payment service system 100 and connected to a financial account with a bank server.

The reader device 1226 may include processing unit(s), computer-readable media, a reader chip, a transaction chip, a timer, a clock, a network interface, a power supply, and so on. The processing unit(s) of the reader device 1226 may execute one or more components and/or processes to cause the reader device 1226 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess local memory, which also may store program components, program data, and/or one or more operating systems. Depending on the exact configuration and type of the reader device 1226, the computer-readable media may include volatile memory (such as RAM), non-volatile memory (such as ROM, flash memory, miniature hard drive, memory card, or the like), or some combination thereof. In some examples, the computer-readable media of the reader device 1226 may include at least one component for performing various functions as described herein.

The reader chip may perform functionalities to control the operations and processing of the reader device 1226. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1212, which may provide a clock signal indicating a time. Furthermore, the reader chip may perform functionality to control the network interface, which may interface with the network(s) 1206, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1226. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have processing unit(s) and computer-readable media and/or the transaction chip may have processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1202, which can be a POS terminal, and the reader device 1226 are shown as separate devices, in additional or alternative examples, the user device 1202 and the reader device 1226 can be part of a single device, which may be a battery-operated device. In such an example, components of both the user device 1202 and the reader device 1226 may be associated with the single device. In some examples, the reader device 1226 can have a display integrated therewith, which can be in addition to (or as an alternative of) the display 1216 associated with the user device 1202.

The server(s) 1204 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1204 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1204 can be located together or separately, and organized, for example, as virtual servers, server banks and/or server farms. The described functionality can be provided by the servers of a single user or enterprise, or can be provided by the servers and/or services of multiple different customers or enterprises.

In the illustrated example, the server(s) 1204 can include one or more processors 1228, one or more computer-readable media 1230, one or more I/O devices 1232, and one or more communication interfaces 1234. Each processor 1228 can be a single processing unit or a number of processing units, and can include single or multiple computing units or multiple processing cores. The processor(s) 1228 can be implemented as one or more microprocessors, microcomputers, microcontrollers, digital signal processors, central processing units, state machines, logic circuitries, and/or any devices that manipulate signals based on operational instructions. For example, the processor(s) 1228 can be one or more hardware processors and/or logic circuits of any suitable type specifically programmed or configured to execute the algorithms and processes described herein. The processor(s) 1228 can be configured to fetch and execute computer-readable instructions stored in the computer-readable media 1230, which can program the processor(s) 1228 to perform the functions described herein.

The computer-readable media 1230 can include volatile and nonvolatile memory and/or removable and non-removable media implemented in any type of technology for storage of information, such as computer-readable instructions, data structures, program components, or other data. Such computer-readable media 1230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1204, the computer-readable media 1230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1230 can be used to store any number of functional components that are executable by the processor(s) 1228. In many implementations, these functional components comprise instructions or programs that are executable by the processors 1228 and that, when executed, specifically configure the one or more processors 1228 to perform the actions attributed above to the multimedia platform 102 and/or payment processing service. Functional components stored in the computer-readable media 1230 can optionally include a media management component 1236, which can include a context determination component 1238, a training component 1240, one or more other components and data 1242, and an operating system 1244.

The functionality of the media management component 1236, the context determination component 1238, are described above with reference to the multi-media platform 1102, the context determination component 1106 of FIG. 11.

The one or more other components and data 1242 can include a user component. The user component can be configured to receive transaction data from POS systems, such as the POS system 624 described above with reference to FIG. 6. The user component can transmit requests (e.g., authorization, capture, settlement, etc.) to payment service server computing device(s) to facilitate POS transactions between users and customers. The user component can communicate the successes or failures of payments associated with the POS transactions to the POS systems. Further, the one or more other components and data 1242 can include programs, drivers, etc., and the data used or generated by the functional components. Further, the server(s) 1204 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that the modules may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of the components functionality (e.g., operations). In some examples, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into the service provider's applications. That is, API(s) and/or SDK(s) can enable third-party developers to customize how their respective third-party applications interact with the service provider or vice versa. Further, SDK(s) and/or API(s) can be used by various platforms/services to enable the various platforms/services (first-party or third-party) to send and/or receive messages via techniques described herein.

The computer-readable media 1230 can additionally include an operating system 1244 for controlling and managing various functions of the server(s) 1204.

The communication interface(s) 1234 can include one or more interfaces and hardware components for enabling communication with various other devices, such as over the network(s) 1206 or directly. For example, communication interface(s) 1234 can enable communication through one or more network(s) 1206, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1202 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1204 can further be equipped with various I/O devices 1232. Such I/O devices 1232 can include a display, various user interface controls (e.g., buttons, joystick, keyboard, mouse, touch screen, biometric or sensory input devices, etc.), audio speakers, connection ports and so forth.

In some examples, the system 1500 can include data store(s) 1246 that can be configured to store data that is accessible, manageable, and updatable. In some examples, the data store(s) 1246 can be integrated with the user device 1202 and/or the server(s) 1204. In other examples, as shown in FIG. 12, the data store(s) 1246 can be located remotely from the server(s) 1204 and can be accessible to the server(s) 1204. The data store(s) 1246 can comprise multiple databases and/or servers connected locally and/or remotely via the network(s) 1206. In some examples, the data store(s) 1246 can correspond to the data store 1112, which are described above as storing user profiles, permission(s), rule(s), and/or the like. In some examples, the data store(s) 1246 can store inventory database(s) and/or catalog database(s), messaging database(s), and/or the like. As described above, an inventory database can store data associated with a quantity of each item that a user has available to the user. Furthermore, a catalog database can store data associated with items that a user has available for acquisition. A communication database can store communications and/or other communications exchanged via the service provider. The data store(s) 1246 can store additional or alternative types of data as described herein.

The phrases "in some examples," "according to various examples," "in the examples shown," "In some examples," "in other examples," "various examples," "some examples," and the like generally mean the particular feature, structure, or characteristic following the phrase is included in some examples of the present technology, and may be included in more than one example of the present technology. In addition, such phrases do not necessarily refer to the same examples or to different examples.

If the specification states a component or feature "can," "may," "could," or "may" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

For clarity of explanation, in some instances the present technology may be presented as including individual functional blocks including functional blocks comprising devices, device components, steps or routines in a method embodied in software, or combinations of hardware and software.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing the instructions, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Example Aspects of the Present Technology Include:

Aspect 1. A method for hosting, by a multi-media platform, a collaborative playlist amongst user accounts whose rights to access the collaborative playlist are determined by an access token linked to an access policy, the method comprising: receiving a request to initiate the collaborative playlist from a first user account; configuring an access policy for the collaborative playlist, the access policy defining access, editing, or control rights to at least one second user; configuring a link to join the collaborative playlist; receiving a request to access the collaborative playlist by a second user account that has followed the link; accessing the access policy for the collaborative playlist by following the pointer in the link to the access policy; determining whether the second user account can be granted access to the collaborative playlist based on the access policy; when it is determined that the access policy allows the second user account to be granted access to the collaborative playlist, granting the second user account access to the collaborative playlist by issuing the access token to the second user account that specifies the editing or control rights permitted to the second user account defined in the access policy.

Aspect 2. The method of Aspect 1, wherein the access token specifies that the access token holder can access the collaborative playlist, the type of editing privileges granted to the access token holder, and the control rights to be granted to the tokens holder, the access, editing privileges and control rights are defined by the access policy.

Aspect 3. The method of any of Aspects 1 to 2, further comprising: assigning a playlist ID to the collaborative playlist.

Aspect 4. The method of any of Aspects 1 to 3, wherein the playlist ID is included with the request to initiate the collaborative playlist.

Aspect 5. The method of any of Aspects 1 to 4, further comprising: associating the first user account as the owner of the collaborative playlist, wherein the owner of the collaborative playlist can adjust the access policy for the collaborative playlist, remove a user account from the collaborative playlist, change a role of a user account that has access to the collaborative playlist, add content items to the collaborative playlist, remove content items from the collaborative playlist, adjust the order of content items in the collaborative playlist, or skip playback of content items in the collaborative playlist.

Aspect 6. The method of any of Aspects 1 to 5, wherein the access policy defines a plurality of user accounts, including the second user account, that are permitted to access the collaborative playlist.

Aspect 7. The method of any of Aspects 1 to 6, the method further comprising: encrypting the access token by the multi-media platform; storing the access token by the multi-media platform; wherein the granting the second user account access to the collaborative playlist with the editing or control rights defined in the access policy further comprising: decrypting the access token; providing the decrypted access token to a device authenticated to the second user; establishing a session between the multi-media platform and the device authenticated to the second user account using the access token, wherein access to the collaborative playlist is defined by the access token.

Aspect 8. The method of any of Aspects 1 to 7, wherein the access token includes a time to live (TTL) that defines an expiration for the access token.

Aspect 9. The method of any of Aspects 1 to 8, further comprising: in coordination with providing the decrypted access token, configuring a schedule to modify or revoke the access token with a scheduler, wherein the schedule to modify or revoke the access token is derived from the access policy when the access policy defines a limited time to access the collaborative playlist or a change in access rights to the collaborative playlist after a period.

Aspect 10. The method of any of Aspects 1 to 9, wherein the access policy specifies user accounts, including the second user account that can access the collaborative playlist, wherein user accounts listed in the access policy are granted access to the collaborative playlist and provided with the decrypted access token.

Aspect 11. The method of any of Aspects 1 to 10, wherein the access policy specifies a class of user accounts that includes the second user account that can access the collaborative playlist, wherein user accounts that are determined to confirm to the class of user accounts listed in the access policy are granted access to the collaborative playlist and provided with the decrypted access token.

Aspect 12. The method of any of Aspects 1 to 11, further comprising: receiving a request to access the collaborative playlist by the second user account, wherein the request to access the collaborative playlist includes the access token; determining whether the access token is valid; after determining that the access token is valid, establishing the session between the multi-media platform and the device authenticated to the second user account using the access token.

Aspect 13. The method of any of Aspects 1 to 12, wherein the access token provides a limited period of access to the collaborative playlist wherein the second user account can add content items to the collaborative playlist during the limited period, and after the limited period the access token provides the second user account with a passive listener role, wherein the second user account can view and listen to the collaborative playlist, but cannot edit the collaborative playlist, or vote for playback of the content items in the collaborative playlist.

Aspect 14. The method of any of Aspects 1 to 13, wherein the limited period of access to the collaborative playlist corresponds to the beginning of an event.

Aspect 15. The method of any of Aspects 1 to 14, wherein the access token provides the second user account with authority to control playback the media items in the collaborative playlist for a period.

Aspect 16. The method of any of Aspects 1 to 15, wherein the second user account is a DJ.

Aspect 17. The method of any of Aspects 1 to 16, wherein the access policy specifies a location, wherein the user account attempting to access the collaborative playlist from the second user device reporting that it is located near the location can access the collaborative playlist.

Aspect 18. The method of any of Aspects 1 to 17, wherein the access policy specifies a proximity to a first user device authenticated to the first user, wherein the second user account attempting to access the collaborative playlist from the second user device can access the collaborative playlist when it is determined that it is proximate to the first user device.

Aspect 19. The method of any of Aspects 1 to 18, further comprising: sending the link to join the collaborative playlist to the first user device to be distributed to the second user account by the first user account on the first user device.

Aspect 20. The method of any of Aspects 1 to 19, further comprising: requesting the second user device to provide an update on the second user device's location; terminating access for the second user account to the collaborative playlist when the update on the location of the second user device indicates that the second user device is not proximate to the first user device.

Aspect 21. The method of any of Aspects 1 to 20, further comprising: receiving a request from the second user account to add a first content item to the collaborative playlist, wherein the request includes metadata identifying the first content item, wherein the metadata includes a content item identifier, an artist name, or a title; identifying an instance of the first content item by the multi-media platform based on the metadata identifying the first content item; adding the first content item to the collaborative playlist.

Aspect 22. The method of any of Aspects 1 to 21, wherein the adding the first content item to the collaborative playlist further comprising: attributing the second user account with adding the first content item to the collaborative playlist.

Aspect 23. The method of any of Aspects 1 to 22, further comprising: receiving a request from a third user account to add a second content item to the collaborative playlist, wherein the request includes metadata identifying the second content item, wherein the metadata includes a second content item identifier, a second artist name, or a second title, wherein the first content item is provided by the multi-media platform and the second content item is provided by a third-party media service, wherein the multi-media platform utilizes an API to browse a content catalog of the third-party service.

Aspect 24. The method of any of Aspects 1 to 23, the method comprising: receiving an instruction to playback the second content item that is provided by the third-party media service; requesting the second content item from the third-party media service; receiving the second content item from the third party in response to the request; sending the second content item to be played back by one or more user devices.

Aspect 25. The method of any of Aspects 1 to 24, further comprising: receiving a command from the first user account to remove the first content item that was added by the second user account from the collaborative playlist.

Aspect 26. The method of any of Aspects 1 to 25, further comprising: presenting a prompt to the first user account notifying the first user account that the first content item was added by the second user account with a selectable user interface option to approve or veto the addition of the first content item from the collaborative playlist.

Aspect 27. The method of any of Aspects 1 to 26, further comprising: providing the first content item for playback; after the first content item has been played-back as part of the collaborative playlist, providing a reward to the second user account for including the first content item in the collaborative playlist.

Aspect 28. The method of any of Aspects 1 to 27, wherein the reward is provided by the first user account.

Aspect 29. The method of any of Aspects 1 to 28, wherein the reward is at least a portion of an amount of value provided by other user accounts that upvoted the first content item and contributed to the playback of the first content item.

Aspect 30. The method of any of Aspects 1 to 29 further comprising: in association with a termination of access to the collaborative playlist by the second user account, saving an instance of a list of the content items in the collaborative playlist that were present when the access to the collaborative playlist was terminated.

Aspect 31. The method of any of Aspects 1 to 30 further comprising: receiving an indication of interest in a first content item in the collaborative playlist from the second user account.

Aspect 32. The method of any of Aspects 1 to 31, wherein the second user account added the second content item to the collaborative playlist and a third user account also added the second content item.

Aspect 33. The method of any of Aspects 1 to 32 further comprising: storing metadata identifying content items in a listening history of the second user account when the content items in the collaborative playlist were played-back while the second user account was accessing the collaborative playlist.

Aspect 34. The method of any of Aspects 1 to 33, wherein the collaborative playlist is a synchronous playlist, the method comprising: receiving a configuration from the first user account that is an owner of the collaborative playlist to designate a first user device from which the first user account has authenticated with the multi-media platform as the playback device for the collaborative playlist.

Aspect 35. The method of any of Aspects 1 to 34, wherein the collaborative playlist is an asynchronous playlist, whereby the first user account and the second user account can access the collaborative playlist, edit the collaborative playlist, and playback content items in the collaborative playlist on their user devices asynchronously.

Aspect 36. The method of any of Aspects 1 to 35, wherein the collaborative playlist is a synchronous playlist, whereby the first user account and the second user account playback content items in the collaborative playlist of their devices synchronously the method comprising: transmitting metadata identifying a first content item in the collaborative playlist with an instruction to begin playback of the first content to a first user device from which the first user account has authenticated with the multi-media platform and to a second user device from which the second user account has authenticated with the multi-media platform, the metadata identifying the first content item and the instruction cause the first user device and the second user device to playback the first content item.

Aspect 37. The method of any of Aspects 1 to 36, wherein the collaborative playlist is a synchronous playlist, the method comprising: receiving a configuration from the first user account that is an owner of the collaborative playlist to designate a first user device from which the first user account has authenticated with the multi-media platform as the playback device for the collaborative playlist.

Aspect 38. The method of any of Aspects 1 to 37, the method comprising: sending a communication from the multi-media platform to a second user device from which the second user account has authenticated with the multi-media platform that has access to the collaborative playlist to disable playback of the collaborative playlist by the second user device.

Aspect 39. The method of any of Aspects 1 to 38, the method comprising: receiving a command to control playback of the collaborative playlist from a second user device from which the second user account has authenticated with the multi-media platform; transmitting the command to control the playback of the collaborative playlist to the first client device, wherein the first user device responds to the command to control the playback of the collaborative playlist.

Aspect 40. The method of any of Aspects 1 to 39, further comprising: establishing a two-way, interactive communication session between the multi-media platform and a first user device from which the first user account has authenticated with the multi-media platform, whereby the first user device receives near real-time updates regarding the command to control the playback of the collaborative playlist or updates regarding content items included in the collaborative playlist.

Aspect 41. The method of any of Aspects 1 to 40, further comprising: establishing a two-way, interactive communication session between the multi-media platform and a second user device from which the second user account has authenticated with the multi-media platform, whereby the first user device receives near real-time updates regarding the command to control the playback of the collaborative playlist or updates regarding content items included in the collaborative playlist.

Aspect 42. The method of any of Aspects 1 to 41, wherein the first user device is linked to an audio system, such as a car speaker, or stereo receiver, or Bluetooth speaker.

Aspect 43. The method of any of Aspects 1 to 42, further comprising: receiving, from a second user device from which the second user account has authenticated with the multi-media platform, a command to skip a content item in the collaborative playlist from playback; sending the command to the first client device that is designated as the playback device for the collaborative playlist.

Aspect 44. The method of any of Aspects 1 to 43, wherein the link to join the collaborative playlist has a time to live (TTL) wherein the link becomes invalid once the TTL expires.

Aspect 45. The method of any of Aspects 1 to 44, wherein the second account is an account of the multi-media platform.

Aspect 46. The method of any of Aspects 1 to 45, wherein the granting the second user account access to the collaborative playlist comprising: assigning the second user account a collaborator role for the collaborative playlist, wherein the collaborator role can add a content item from the collaborative playlist, remove the content item from the collaborative playlist, skip playback of a content item, or vote on a playback order for content items in the collaborative playlist.

Aspect 47. The method of any of Aspects 1 to 46, further comprising: assigning the second user account a passive listener role for the collaborative playlist, wherein the passive listener role can view the collaborative playlist and listen to playback of the collaborative playlist but cannot skip content items or vote on a playback order for content items in the collaborative playlist.

Aspect 48. The method of any of Aspects 1 to 47, further comprising: assigning the second user account an active listener role for the collaborative playlist, wherein the active listener role can view the collaborative playlist and listen to playback of the collaborative playlist, and can vote on a playback order for content items in the collaborative playlist.

Aspect 49. The method of any of Aspects 1 to 48, wherein the second account is a temporary account created because a second user has not created an account at the multi-media platform, the method further comprising: assigning the temporary account a limited access role wherein the temporary account can view the collaborative playlist, and receives a limited amount of media item playbacks, and cannot vote for content items to be upvoted to play sooner.

Aspect 50. The method of any of Aspects 1 to 49, further comprising: receiving a vote for a content item in the collaborative playlist from the second user account, the vote is an indication of support for the content item to be promoted in an order of content items in the collaborative playlist; aggregating votes including the vote from the second user account, wherein the content item receiving the greatest total of votes is promoted to the top of the order of content items in the collaborative playlist.

Aspect 51. The method of any of Aspects 1 to 50, wherein a number of votes allotted to the second user account over a period is limited.

Aspect 52. The method of any of Aspects 1 to 51, wherein the vote is a monetary contribution of a particular value.

Aspect 53. The method of any of Aspects 1 to 52, further comprising: initiating a first transaction that transfers currency for the monetary contribution from the second user account to the multi-media platform; transferring an aggregate amount of money contributions pertaining to the collaborative playlist to the owner of the collaborative playlist in a second transaction; recording a record of the second transaction on a public ledger.

Aspect 54. The method of any of Aspects 1 to 53, further comprising: receiving an instruction to transfer a portion the aggregate amount of money contributions to a particular artist in a third transaction; recording a record of the third transaction on a public ledger.

Aspect 55. The method of any of Aspects 1 to 54, further comprising: initiating a first transaction that transfers currency for the monetary contribution from the second user account to the multi-media platform; based on a currency access policy configured by the owner of the collaborative playlist to transfer currency for the monetary contribution associated with a particular content item to an artist associated with the particular content item, transferring an aggregate amount of money contributions pertaining to the monetary contributions as the vote for the particular content item to the particular artist in a second transaction; recording a record of the second transaction on a public ledger.

Aspect 56. The method of any of Aspects 1 to 55, wherein the collaborative playlist is managed and hosted by the multi-media platform, further comprising: receiving an instruction to playback the second content item that is provided by the third-party media service; identifying an instance of the second content item provided by the multimedia platform, wherein the instance may not be an exact match; sending the instance of the second content item to be played back by one or more user devices.

Aspect 57. The method of any of Aspects 1 to 56, wherein the vote includes a value indicating a strength of the vote.

Aspect 58. The method of any of Aspects 1 to 57, wherein a user account skips or votes least get priority to skip or priority to upvote.

Aspect 59. The method of any of Aspects 1 to 58, further comprising: receiving a skip command for a content item in the collaborative playlist from the second user account; presenting a veto option to the first user account to veto the skip command from the second user account.

Aspect 60. The method of any of Aspects 1 to 59, wherein the collaborative playlist can be used by a DJ to run a radio show.

Aspect 61. The method of any of Aspects 1 to 60, further comprising: determining a preference value for content items in the collaborative playlist, wherein the preference value reflects an average or aggregate score reflecting a preference of a group of user accounts that are members of the collaborative playlist for individual content items in the collaborative playlist; arranging the play back order for the collaborative playlist based on the preference values.

Aspect 62. The method of any of Aspects 1 to 61, wherein the determining the preference value includes: averaging individual preference scores for the user accounts for respective individual content items to result in an average preference value for respective individual content items; or creating a cluster of the user accounts that are members of the collaborative playlist in an embedding space that combines user accounts with content items, and determining a proximity value between a centroid of the cluster of user accounts to the respective individual content items, whereby the closer to an individual content item, the stronger the preference score; or where each link between a user account and an individual content item includes a weight that represents a preference for the content item by the user account, and averaging the weights between respective user accounts and respective media items to result in an average preference value for respective individual content items.

What is claimed is:

1. A method comprising:
    receiving a first request to initiate a collaborative playlist from a first user account;
    sending an interactive element to join the collaborative playlist to a first user device associated with the first user account;
    receiving user input, via a user interface displayed at the first user device, to configure the collaborative playlist with at least a first access policy or a second access policy, the first access policy permitting a second user account to add content items to the collaborative playlist and the second access policy permitting the second user account to add content items to the collaborative playlist and control playback of the collaborative playlist;
    receiving a second request to access the collaborative playlist by the second user account responsive to interaction by the second user account with the interactive element, wherein the interactive element comprises a quick response (OR) code that is displayed by the first user device, and wherein the interaction by the second user account comprises a second user device associated with the second user account capturing an image of the QR code displayed by the first user device; and
    responsive to the second request, granting the second user account access to the collaborative playlist according to the first access policy or the second access policy.

2. The method of claim 1, wherein the first user account is connected to a car, and wherein the collaborative playlist is played through a car speaker system of the car.

3. The method of claim 1, wherein the first user account is connected to a loudspeaker, and wherein the collaborative playlist is played through the loudspeaker.

4. The method of claim 1, wherein the user input configures the collaborative playlist with the first access policy, and wherein the granting comprises granting the second user account access to the collaborative playlist according to the first access policy.

5. The method of claim 4, wherein the access prevents the second user account from controlling playback of the collaborative playlist.

6. The method of claim 5, further comprising receiving additional user input, via the user interface displayed at the first user device, to configure the collaborative playlist with the second access policy, wherein the additional user input enables the second user account to control playback of the collaborative playlist.

7. The method of claim 1, wherein the user input configures the collaborative playlist with the second access policy, and wherein the granting comprises granting the second user account access to the collaborative playlist according to the second access policy.

8. A non-transitory computer-readable storage medium, the computer-readable storage medium including instructions that when executed by a computer, cause the computer to:
- receive a first request to initiate a collaborative playlist from a first user account;
- send an interactive element to join the collaborative playlist to a first user device associated with the first user account;
- receive user input, via a user interface displayed at the first user device, to configure the collaborative playlist with at least a first access policy or a second access policy, the first access policy permitting a second user account to add content items to the collaborative playlist and the second access policy permitting the second user account to add content items to the collaborative playlist and control playback of the collaborative playlist;
- receive a second request to access the collaborative playlist by the second user account responsive to interaction by the second user account with the interactive element, wherein the interactive element is communicated from the first user device to a second user device associated with the second user account, and wherein the second request is received responsive to user interaction with the interactive element at the second user device; and
- responsive to the second request, grant the second user account access to the collaborative playlist according to the first access policy or the second access policy.

9. The non-transitory computer-readable storage medium of claim 8, wherein the interactive element comprises a quick response (QR) code.

10. The non-transitory computer-readable storage medium of claim 8, wherein the first user account is connected to a car, and wherein the collaborative playlist is played through a car speaker system of the car.

11. The non-transitory computer-readable storage medium of claim 8, wherein the interactive element comprises a hyperlink or a uniform resource location (URL).

12. The non-transitory computer-readable storage medium of claim 8, wherein the first user account is connected to a loudspeaker, and wherein the collaborative playlist is played through the loudspeaker.

13. A computing system comprising:
a processor; and
a memory storing instructions that, when executed by the processor, are configured to:
- receive a first request to initiate a collaborative playlist from a first user account;
- send an interactive element to join the collaborative playlist to a first user device associated with the first user account;
- receive user input, via a user interface displayed at the first user device, to configure the collaborative playlist with at least a first access policy or a second access policy, the first access policy permitting a second user account to add content items to the collaborative playlist and the second access policy permitting the second user account to add content items to the collaborative playlist and control playback of the collaborative playlist;
- receive a second request to access the collaborative playlist by the second user account responsive to interaction by the second user account with the interactive element; and
- responsive to the second request, grant the second user account access to the collaborative playlist according to the first access policy or the second access policy.

14. The computing system of claim 13, wherein the interactive element comprises a quick response (QR) code, wherein the QR code is displayed on the first user device, wherein the second request is received responsive to a second user device associated with the second user account interacting with the QR code displayed on the first user device, and wherein the second user device associated with the second user account interacts with the QR code displayed on the first user device by capturing an image of the QR code.

15. The computing system of claim 14, wherein the first user account is connected to a car, and wherein the collaborative playlist is played through a car speaker system of the car.

16. The computing system of claim 14, wherein the interactive element is communicated from the first user device to a second user device associated with the second user account, and wherein the second request is received responsive to user interaction with the interactive element at the second user device.

17. The computing system of claim 13, wherein the user input configures the collaborative playlist with the first access policy, and wherein the granting comprises granting the second user account access to the collaborative playlist according to the first access policy.

18. The computing system of claim 17, wherein the access prevents the second user account from controlling playback of the collaborative playlist.

19. The computing system of claim 18, further comprising receiving additional user input, via the user interface displayed at the first user device, to configure the collaborative playlist with the second access policy, wherein the additional user input enables the second user account to control playback of the collaborative playlist.

20. The computing system of claim 13, wherein the user input configures the collaborative playlist with the second access policy, and wherein the granting comprises granting the second user account access to the collaborative playlist according to the second access policy.

* * * * *